(12) United States Patent
Nassar et al.

(10) Patent No.: US 12,503,558 B2
(45) Date of Patent: Dec. 23, 2025

(54) ENHANCED PRODUCTION OF HUMIC ACIDS FROM COAL-LIGNITE VIA WATER-OXYGEN SYSTEMS

(71) Applicant: Carbon Oxytech Inc., Calgary (CA)

(72) Inventors: Nashaat N. Nassar, Calgary (CA); Abdallah D. Manasrah, Calgary (CA)

(73) Assignee: Carbon Oxytech Inc., Calgary (CA)

( * ) Notice: Subject to any disclaimer, the term of this patent is extended or adjusted under 35 U.S.C. 154(b) by 823 days.

(21) Appl. No.: 17/783,578

(22) PCT Filed: Dec. 10, 2020

(86) PCT No.: PCT/CA2020/051704
§ 371 (c)(1),
(2) Date: Jun. 8, 2022

(87) PCT Pub. No.: WO2021/113978
PCT Pub. Date: Jun. 17, 2021

(65) Prior Publication Data
US 2023/0061903 A1 Mar. 2, 2023

Related U.S. Application Data

(60) Provisional application No. 62/946,212, filed on Dec. 10, 2019.

(51) Int. Cl.
*C08H 6/00* (2010.01)
*C05F 11/02* (2006.01)
*C08H 7/00* (2011.01)

(52) U.S. Cl.
CPC .............. *C08H 6/00* (2013.01); *C05F 11/02* (2013.01)

(58) Field of Classification Search
CPC ..................................................... C08H 6/00
USPC ......................................................... 544/102
See application file for complete search history.

(56) References Cited

U.S. PATENT DOCUMENTS 5,670,345 A 9/1997 Srivastava et al.

FOREIGN PATENT DOCUMENTS

| CA | 2195231 A1 | 7/1997 |
|---|---|---|
| ES | 2678421 A1 | 8/2018 |
| RU | 2010116035 A | 10/2011 |

OTHER PUBLICATIONS

Pulidindi, K. and H. Pandey. Humic Acid Market to exceed USD 1 billion by 2024. 2017 [cited Jan. 20, 2019]; Available from: https://www.gminsights.com/pressrelease/humic-acid-market.
Ramos, L., E.M. Kristenson, and U.T. Brinkman, Current use of pressurised liquid extraction and subcritical water extraction in environmental analysis. Journal of Chromatography A, 2002. 975(1): p. 3-29.
Reddy, S.B., et al., Fourier Transform Infrared (FTIR) Spectroscopy of Soil Humic and Fulvic Acids Extracted from Paddy Land Use System. Int. J. Curr. Microbiol. App. Sci, 2018. 7(5): p. 834-837.
Research, G.V. Industry Research Report. 2016 [cited Aug. 10, 2019 ]; Available from: https://www.grandviewresearch.com/industry-analysis/humic-acid-market.
Sarlaki, E., et al., Extraction and purification of humic acids from lignite wastes using alkaline treatment and membrane ultrafiltration. Journal of Cleaner Production, 2019. 235: p. 712-723.
Sasaki, Y. and T. Oyamada, Studies on the chemical utilization of lignite (IV): Alkali semi-dry method for preparing humic acids. Bulletin of Yamagata University, 1966. 9(1): p. 121-129.
Schmidt, L., Changes in coal during storage. Chemistry of coal utilization, 1945. 18: p. 627-676.
Shi, T., et al., The mechanism at the initial stage of the room-temperature oxidation of coal. Combustion and Flame, 2005. 140(4): p. 332-345.
Simsek, Y.E. and L. Degirmenci, Effect of Atmosphere and Temperature Treatment on Leonardite for Increasing Humic Acid Yield. Journal of the Geological Society of India, 2018. 92(2): p. 209-214.
Tang, Y., et al., Value-added humic acid derived from lignite using novel solid-phase activation process with Pd/CeO2 nanocatalyst: a physiochemical study. ACS Sustainable Chemistry & Engineering, 2017. 5(11): p. 10099-10110.
Technavio. Global Humic Acid Market—Forecasts and Analysis. 2017 [cited Mar. 12, 2019]; Available from: https://www.businesswire.com/news/home/20171003005921/en/Global-Humic-Acid-Market---Forecasts-Analysis.
Uyguner, C.S. and M. Bekbolet, Evaluation of humic acid photocatalytic degradation by UV-vis and fluorescence spectroscopy. Catalysis Today, 2005. 101(3-4): p. 267-274.
Uyguner, C.S., et al., Evaluation of adsorption and coagulation characteristics of humic acids preceded by alternative advanced oxidation techniques. Desalination, 2007. 210(1-3): p. 183-193.
Wali, A., et al., A novel humic acid extraction procedure from Tunisian lignite. Euro-Mediterranean Journal for Environmental Integration, 2019. 4(1): p. 24.
Wang, H., B.Z. Dlugogorski, and E.M. Kennedy, Coal oxidation at low temperatures: oxygen consumption, oxidation products, reaction mechanism and kinetic modelling. Progress in energy and combustion science, 2003. 29(6): p. 487-513.
Wang, H., B.Z. Dlugogorski, and E.M. Kennedy, Role of inherent water in low-temperature oxidation of coal. Combustion Science and Technology, 2003. 175(2): p. 253-270.
Yammine, S., et al., Extraction and purification of high added value compounds from by-products of the winemaking chain using alternative/nonconventional processes/technologies. Critical reviews in food science and nutrition, 2018. 58(8): p. 1375-1390.

(Continued)

*Primary Examiner* — Taofiq A Solola
(74) *Attorney, Agent, or Firm* — GREENBERG TRAURIG, LLP

(57) ABSTRACT

Processes are provided for the production of humic acids from coal such as lignite, involving mixing comminuted coal solids with an aqueous alkaline solution under subcritical extraction conditions, which comprise an extraction temperature of from 25 to 50° C.; an extraction pressure of from >0.1 MPa to <0.5 MPa; a flow of an oxygen containing gas; and potassium hydroxide.

13 Claims, 16 Drawing Sheets

(56) References Cited

OTHER PUBLICATIONS

Yammine, S., Extraction des molécules à haute valeur ajoutée par eau sous critique et fractionnement par procédés membranaires: Valorisation des co-produits de la vigne et du vin par des procédés éco-innovants. 2016, Bordeaux.

Yildirim: "Oxidation of Kangal/Sivas lignite at 70° C and 90° C "; Energy Sources (2003), 25(10), 1023-1032.

Yuan, C., et al., Environment friendly bleaching methods of montan wax. J. Chem. Pharm. Res, 2014. 6: p. 1223.

Zhang, Y., et al., A comparative study on the structural features of humic acids extracted from lignites using comprehensive spectral analyses. RSC Advances, 2020. 10(37): p. 22002-22009.

Zhang, Y.-Y., et al., Investigation on the structural feature of Shengli lignite. International Journal of Mining Science and Technology, 2018. 28(2): p. 335-342.

Zingaretti, D., et al., Humic Substances Extracted from a Bio stabilized Waste Applying Different Operating Conditions. Waste and Biomass Valorization, 2020.

Ahmed, F., Chemical Characterization of Humic and Fulvic Acid Analogs Obtained from Wet Air Oxidation (WAO) at Different severities. 2018, Schulich School of Engineering.

Ashtari, M., L. Carbognani, and P. Pereira-Almao, Asphaltenes aqueous conversion to humic and fulvic analogs via oxy-cracking. Energy & Fuels, 2016. 30(7): p. 5470-5482.

Asing, J., N. Wong, and S. Lau, Optimization of extraction method and characterization of humic acid derived from coals and composts. J. Trop. Agric. and Fd. Sc, 2009. 37(2): p. 211-223.

Badran, I., A.D. Manasrah, and N.N. Nassar, A combined experimental and density functional theory study of metformin oxy-cracking for pharmaceutical wastewater treatment. RSC Advances, 2019. 9(24): p. 13403-13413.

Bozan, B., G. Tosun, and D. Özcan, Study of polyphenol content in the seeds of red grape (*Vitis vinifera* L.) varieties cultivated in Turkey and their antiradical activity. Food chemistry, 2008. 109(2): p. 426-430.

Burdick, E.M., Commercial humates for agriculture and the fertilizer industry. Economic Botany, 1965. 19(2): p. 152-156.

Calemma, V., et al., Changes in coal structure accompanying the formation of regenerated humic acids during air oxidation. Fuel, 1994. 73(5): p. 700-707.

Canellas, L.P., et al., Humic acids increase the maize seedlings exudation yield. Chemical and Biological Technologies in Agriculture, 2019. 6(1): p. 3.

Chen, Y., N. Senesi, and M. Schnitzer, Information provided on humic substances by E4/E6 ratios 1. Soil science society of America journal, 1977. 41(2): p. 352-358.

Cheng, G., et al., Extraction of humic acid from lignite by KOH-hydrothermal method. Applied Sciences, 2019. 9(7): p. 1356.

Clemens, A.H., T.W. Matheson, and D.E. Rogers, Low temperature oxidation studies of dried New Zealand coals. Fuel, 1991. 70(2): p. 215-221.

Deshpande, G.V., et al., Extraction of coal using supercritical water. Fuel, 1984. 63(7): p. 956-960.

Dick, D.P., et al., Chemical and spectroscopical characterization of humic acids from two south Brazilian coals of different ranks. Journal of the Brazilian Chemical Society, 2002. 13(2): p. 177-182.

Doskočil, L., et al., Spectral characterization and comparison of humic acids isolated from some European lignites. Fuel, 2018. 213: p. 123-132.

Estévez, M., et al., Formation of humic acids in lignites and subbituminous coals by dry air oxidation. Fuel, 1990. 69(2): p. 157-160.

Feng, L., et al., Construction of the molecular structure model of the Shengli lignite using TG-GC/MS and FTIR spectrometry data. Fuel, 2017. 203: p. 924-931.

Fong, S.S., et al., A comparative evaluation on the oxidative approaches for extraction of humic acids from low rank coal of Mukah, Sarawak. Journal of the Brazilian Chemical Society, 2007. 18(1): p. 34-40.

Fong, S.S., et al., Characterization of the coal derived humic acids from Mukah, Sarawak as soil conditioner. Journal of the Brazilian Chemical Society, 2006. 17(3): p. 582-587.

Fuentes, M., et al., New methodology to assess the quantity and quality of humic substances in organic materials and commercial products for agriculture. Journal of soils and sediments, 2018. 18(4): p. 1389-1399.

Fukushima, M., et al., Acid-base characterization of molecular weight fractionated humic acid. Talanta, 1996. 43(3): p. 383-390.

Guerrero, M.S., J.S. Torres, and M.J. Nuñez, Extraction of polyphenols from white distilled grape pomace: Optimization and modelling. Bioresource technology, 2008. 99(5): p. 1311-1318.

Headley, J.V., et al., Determination of dissolved naphthenic acids in natural waters by using negative-ion electrospray mass spectrometry. Journal of AOAC International, 2002. 85(1): p. 182-187.

Huculak-Mączka, M., J. Hoffmann, and K. Hoffmann, Evaluation of the possibilities of using humic acids obtained from lignite in the production of commercial fertilizers. Journal of soils and sediments, 2018. 18(8): p. 2868-2880.

Ikeya, K., et al., Size distribution of condensed aromatic rings in various soil humic acids. Organic geochemistry, 2011. 42(1): p. 55-61.

ISO-19822, Fertilizers and soil conditioners—Determination of humic and hydrophobic fulvic acids concentrations in fertilizer materials. 2018: International Organization for Standardization.

Jiang, P.W., Z.J. Ma, and Y.X. Han. Experimental study on extracting humic acid from lignite. in Advanced Materials Research. 2011. Trans Tech Publ.

Jones, R. and D. Townend, Mechanism of the oxidation of coal. Nature, 1945. 155(3936): p. 424-425.

Jones, R. and D. Townend, The oxidation of coal. Journal of the Society of Chemical Industry, 1949. 68(7): p. 197-201.

Ju, Z.Y. and L.R. Howard, Effects of solvent and temperature on pressurized liquid extraction of anthocyanins and total phenolics from dried red grape skin. Journal of Agricultural and food Chemistry, 2003. 51(18): p. 5207-5213.

Juan et al.: "Production of humic acids from lignites and subbituminous coals by alkaline-air oxidation"; Fuel (1990), 69(2), 161-165.

Kashimura, N., J.-i. Hayashi, and T. Chiba, Degradation of a Victorian brown coal in sub-critical water. Fuel, 2004. 83(3): p. 353-358.

Khan, S. and M. Schnitzer, The retention of hydrophobic organic compounds by humic acid. Geochimica et Cosmochimica Acta, 1972. 36(7): p. 745-754.

Kononova, M. and I. Alexandrova, Formation of humic acids during plant residue humification and their nature. Geoderma, 1973. 9(3): p. 157-164.

Kurková, M., et al., Humic acids from oxidized coals: I. Elemental composition, titration curves, heavy metals in HA samples, nuclear magnetic resonance spectra of HAs and infrared spectroscopy. Chemosphere, 2004. 54(8): p. 1237-1245.

Kutepatil, O. Humic Acid Market to witness heavy demand in agriculture sector, North America to be the leading growth avenue. 2017 [cited Jan. 18, 2019]; Available from: https://gminsights.wordpress.com/2017/05/31/humic-acid-market/.

Lavrik, N.L. and N.M. Bazhin, Express: Study on the Self-Association of the Macromolecules of Humic Acid "Aldrich" in Aqueous Solutions Using Ultraviolet-Visible (UV-Vis) Absorption Spectroscopy. Applied spectroscopy, 2019: p. 0003702819829809.

Liu, F.-J., et al., Selective production and characterization of aromatic carboxylic acids from Xianfeng lignite-derived residue by mild oxidation in aqueous H2O2 solution. Fuel processing technology, 2018. 181: p. 91-96.

Luong, D., M.A. Sephton, and J.S. Watson, Subcritical water extraction of organic matter from sedimentary rocks. Analytica chimica acta, 2015. 879: p. 48-57.

Manasrah, A.D., Conversion of Petroleum Coke into Valuable Products using Catalytic and Non-Catalytic Oxy-Cracking Reaction. 2018.

(56) References Cited

OTHER PUBLICATIONS

Manasrah, A.D., et al., Experimental and theoretical studies on oxy-cracking of Quinolin-65 as a model molecule for residual feedstocks. Reaction Chemistry & Engineering, 2017. 2(5): p. 703-719.

Manasrah, A.D., N.N. Nassar, and L.C. Ortega, Conversion of petroleum coke into valuable products using oxy-cracking technique. Fuel, 2018. 215: p. 865-878.

Marieh, N., Characterization of soil humic substances in Hungarian and Iranian soils. Unpublished Ph. D. Thesis, Szentistvan University, 2012.

Market, G.H.A. Transparency Market Research. 2018 [cited Jan. 16, 2019]; Available from: https://www.transparencymarketresearch.com/pressrelease/humic-acid-market.htm.

Moschopedis, S.E. and J.G. Speight, Influence of metal salts on bitumen oxidation. Fuel, 1978. 57(4): p. 235-240.

Patil, P.T., et al., Heterogeneously catalyzed hydroprocessing of organosolv lignin in sub-and supercritical solvents. Energy & Fuels, 2011. 25(10): p. 4713-4722.

Petit, J., A comprehensive study of the water vapour/coal system: application to the role of water in the weathering of coal. Fuel, 1991. 70(9): p. 1053-1058.

Pettit, R.E., Organic matter, humus, humate, humic acid, fulvic acid and humin: their importance in soil fertility and plant health. CTI Research, 2004: p. 1-17.

Peuravuori, J., P. Žbánková, and K. Pihlaja, Aspects of structural features in lignite and lignite humic acids. Fuel Processing Technology, 2006. 87(9): p. 829-839.

Piccolo, A., S. Nardi, and G. Concheri, Structural characteristics of humic substances as related to nitrate uptake and growth regulation in plant systems. Soil Biology and Biochemistry, 1992. 24(4): p. 373-380.

Pulidindi, K. and H. Pandey. Humic acid market size by application. 2017 [cited Jan. 20, 2019]; Available from: https://www.gminsights.com/industry-analysis/humic-acid-market.

ENHANCED PRODUCTION OF HUMIC ACIDS FROM COAL-LIGNITE VIA WATER-OXYGEN SYSTEMS

RELATED APPLICATIONS

The present application is a national phase filing under 35 USC 371 of International Application No. PCT/CA2020/051704, filed on Dec. 10, 2020, which claims priority of U.S. Provisional Application No. 62/946,212, filed on Dec. 10, 2019, the contents of which are incorporated herein in their entirety for all purposes.

FIELD

The invention is in the field of aqueous systems for extraction of organic compounds from carboniferous solids.

BACKGROUND

The global humic acids market is expected to grow at a significant rate due to increasing demand in agriculture sector [1]. According to a new research report by Global Market Insights [2], the global market for humic acids is expanding with more than USD$540 millions in 2019 and will witness growth above 14.4% of the compound annual growth rate. North America, for instance, is a major consumer with the highest demand attributable to the USA, where consumption is driven by high demand for pollution detoxifiers and organic electrolytes [3]. Increasing biological stimulant consumption in agriculture will strengthen North America growth over the forecast horizon [4]. Among the various applications areas of humic acids, agriculture is anticipated to be the most revenue generating over the assessment period of 2019-2026 [3]. The largest market application of humic acids includes agriculture, horticulture, dietary supplements, concrete, and ecological bioremediation. The agricultural segment held over 50% of the revenue in the global humic acids in 2015 and is expected to rise at a lucrative pace in the next few years [5]. Additionally, according to a report by the World Health Organization, the world agricultural output must be increased by minimum of 50% per hectare to meet the demand supply mismatch [1]. As per the estimates, the global food demand is expected to rise over 35% by 2030 [6]. To meet this demand, farmers are turning towards sustainable farming techniques to enhance their production capabilities.

Humic substances (HS) are defined as organic materials naturally produced by oxidative decomposition of complex organic molecules, which play a critical role in the global carbon cycle. HS can be classified into three main fractions based on their solubilities in acidic and alkaline solutions, namely: Humic acids (HA), the alkali-soluble but acid-insoluble fraction, fulvic acids (FA), soluble in both alkali and acid mediums, and the humin material, which can not be extracted neither with acid nor with base [7, 8]. These substances are similar in chemical fractions, but they are different in molecular weight. The chemical structure of HS comprises aromatic rings attached to aliphatic chains and its chemical compositions are varying depending upon their origin [9]. The major elemental compositions of HS are carbon (53.8-58.7 wt %), hydrogen (3.2-6.2 wt %), nitrogen (1.2-5.0 wt %), oxygen (33.6-43.5 wt %) and sulfur which are permanently present regardless of their origin and country [10, 11]. Additionally, a small amount of K, Na, Ca, Mg, Fe, Si and other ash elements can be attached physically and chemically to the HS structure [12]. Humic acids, the main fractions of humic substances, has the most active components of soil and compost organic matter. It contains a series of relatively high-molecular-weight species ranging from approximately 5,000 to 100,000 Daltons with many functional groups due to the oxygen incorporation in the aromatic backbone. The benefits of HA in improving crop productivity and soil fertility is well established, especially in soils with low organic matter and its importance for human health and animal husbandry [14]. This fact providing a trigger for a world-wide production of industrial humic products [15]. Particularly, HS is not only enhancing the availability of micronutrients uptake and utilizing the plants through chelating minerals but also can be the main source of organic carbon to plants through their degradation. Besides that, the HS acts as soil pH buffers and redox agents and has the ability to stimulate plant growth. Conventionally, HA is being manufactured from organic raw materials, mainly lignite, brown coals, peat, lake-bottom sediments and humified organic materials [16]. Among these carbonaceous sources, the low-rank coal lignite which reserves nearly 45% of the global coal has recently attracted great attention in humic acids production. Because it has abundant oxygen functional moieties, low calorific value, and high moisture content, its direct and wide application has critically restricted, thus it is often piled up in coal mining [17, 18]. Recently, humic acid extraction, as a predominant fraction of humic substances, from lignite coal has become a promising research hotspot for crops utilization [19-23]. The amount of extractable HA was found to be affected by several factors, such as type of extraction process, reaction temperature, type and concentration of extractant agent, particle size of lignite, coal to water ratio, reaction time, and most importantly lignite original sources [24]. Such activation and extraction processes include physical and chemical methods to better utilize humic substances from lignite using oxidizing agents such as HNO3, KMnO4, and H2O2 to activate the samples and thus increase the yield. However, these processes require high water as a reaction medium, high demand for energy, long reaction time, and high standards of equipment. For instance, the yield percentage of extractable HA using various raw materials, such as leonardite (oxidized lignite), lignite, peat, brown coal, biochar, compost, biorefinery wastes (biogas digestates), and sludges, have been reported to be 40-90, 30-80, 10-35, 10-25, 10-20, 5-15, 2-10, and 1-5%, respectively [20, 25, 26]. Besides the low yield of humic acids, these processes have many environmental concerns due to the release of undesired byproducts into the natural environment [27]. Fong et al. for instance, compare the yield of extracted humic acids by oxidizing the low-rank coal with HNO3, H2O2 and KMnO$_4$. The results showed that a higher yield of humic acids was obtained using HNO3 in comparison with other oxidizing agents. However, the use of acid (HNO3) is not economically feasible as it is more expensive than the obtained products, in addition to the long processing time required for large coal particles. Extensive research has been performed on the production of humic acids by coal bio-oxidation, however, this approach is a noteworthy expensive and significant amount of undesired products may be produced such as metabolic. Srivastava and Walia, 1997 used thermophilic aerobic process in presence of water for extracting humic acids from coal. Their reported reaction time was around 48 h with a high loading of bacteria seeds (20 wt %) [29]. Recently, an inventive method of humic acids was licensed by Prosyolkov et al. using an ultrasonic reactor and multiple filtrations. The method includes two-stage crushing of brown coal into microparticles before being suspended in the alkaline solution with mechanical stirring in the reactor-mixer. Despite the proposed method contains several steps, the obtained humic acids from liquid phase was sedimented after at least 24 hours. These aforementioned drawbacks have limited the development of activation technologies for utilizing humic substances of low-rank coal lignite. Thus, it is necessary to develop novel and environmentally friendly extraction process to utilize high yield of low-cost lignite. It was reported that the yield of extractable HA and its chemical characteristics depend on several factors including the types and source of organic material, temperature, frequency of extraction, grain size, extracting agent and drying procedure [13]. The extraction under an elevated temperature greatly increases the HA yield compare with that one at room temperature [31]. Although the extraction of humic substances process has been studied widely and for a long time their formation is still the subject of long-standing and continued research [32]. Therefore, with the high demand on the humic acids products and abundant availability of lignite and sub-bituminous coals in Canada, it may have commercial value if methods are developed to extract HA from these local sources.

SUMMARY

Increasing market demand and technological progress in the field of humic acids (HA) has contributed to a significant interest in exploring alternative routes for high yield production of HA from naturally sourced materials. Processes are accordingly provided herein for high yield production of humic acids using water-oxygen systems. These processes facilitate the creation of economic values from low-rank coal by conversion into value-added products, such as humic acids, via water-oxygen media. Alternative operating conditions are disclosed that optimize the yield and selectivity of humic acids. The relevant operating conditions may include, for example, oxygen partial pressure, temperature, reaction time, type and dosage of alkaline solutions, and coal-lignite to water ratio. Optimal processing conditions are disclosed is select embodiments that involve the use of potassium hydroxide solutions as an extraction agent, at a temperature of 50° C. and pressures <0.5 MPa; in select embodiments the yield of HA reaches 94%. The isolated HA was characterized by FTIR, UV-vis spectrophotometer and elemental analysis. The produced HA was found to have functionalities of carboxylic, carbonyl, and phenolic compounds. The results also showed that the operating conditions for extraction of humic acids from coal-lignite has significant effects on improving the product quantity and preserving quality.

Processes are accordingly provided for the production of humic acids from a coal comprising a humic substance content, the process comprising:
  mixing a comminuted coal solids fraction derived from the coal with an alkaline solution to produce a pre-solubilized slurry;
  treating the pre-solubilized slurry under subcritical extraction conditions in a basic aqueous extraction medium for an effective extraction residence time period of less than 1, 2, 3 or 4 hours to extract humic acids from the coal solids, wherein the extraction conditions comprise:
    an extraction temperature of from 25 to 50° C.;
    an extraction pressure of from >0.1 MPa to <0.5 Ma;
    a flow of an oxygen containing gas; and, KOH; and,
  separating a humic acid solution product stream from residual solids and recovering the humic acid solution product stream, wherein the humic acid solution product stream comprises humic acids and fulvic acids, wherein the proportion of humic acids to fulvic acids in the humic acid solution product stream is at least 85% humic acids, wherein the conversion of the humic substance content of the coal into the humic acids and fulvic acids of the humic acid solution product stream is at least 90%; and wherein the proportion of the humic substance content of the coal converted to $CO_2$ under the extraction conditions during the extraction time period is less than 5%.

Figure 1:
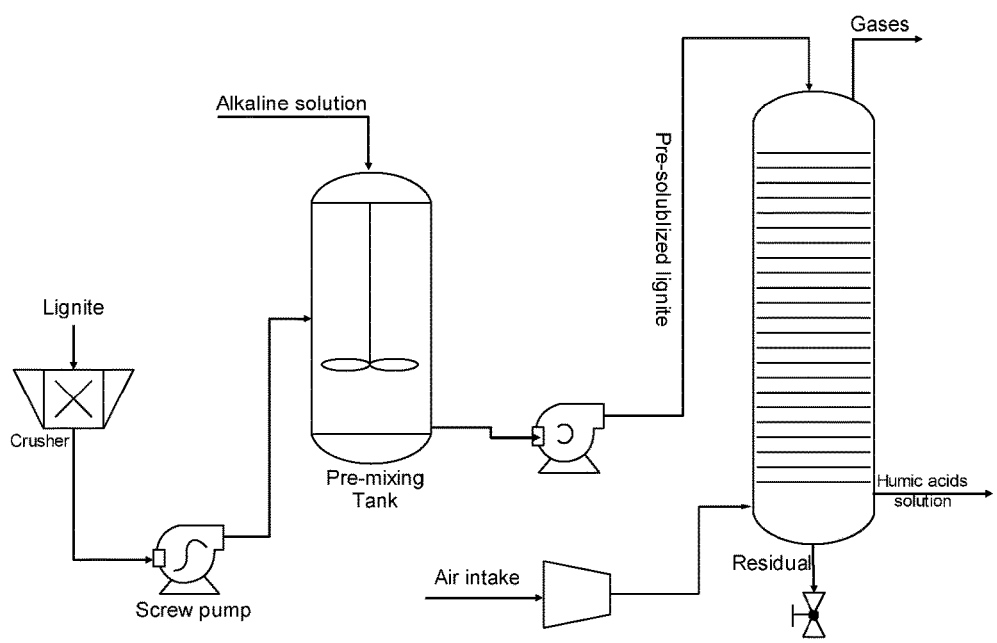
FIG. 1. Schematic representation of the proposed process flow diagram for humic acid production.

The step for CO2 production can only be produced at temperature >150° C. for the case of dry oxidation.

DETAILED DESCRIPTION

Disclosed herein are methods of extracting HA from coals, such as low-quality lignite coals, by employing air, or another oxygen containing gas flow, in an alkaline extraction medium at relatively low temperature (e.g. up to 50° C.) to increase the yield of HA, in a process involving oxy-cracking-a combination of consecutive oxidation and cracking reactions in an aqueous alkaline medium at mild temperatures. In the present context, lower operating conditions are implemented than that of oxy-cracking, such as low temperatures of from 25 to 50° C. and mild pressures of 0.69-3.4 MPa. During the water-oxygen (aeration) process, even at low temperatures and pressures, it has been demonstrated that the coal hydrocarbons (humic substances) will be partially oxidized/oxygenated to form humic acid analogs, thus causing the oxygenated hydrocarbons to become soluble in the alkaline water.

The humic acid product of the present processes may have many uses. For example, the oxygen functional groups that are created in the present extraction processes, such as phenol, carboxyl, hydroxyl, enolic-OH, and ketone, may facilitate the use of the humic acid product to increase the cation exchange capacity of the soil [38]. Other functional groups such as amines (R—NH2) and sulfur (S=O=S) modify the chemical properties of the soil, stimulate plant growth and generally make the HA more biologically active [39]. Additionally, these large molecular weight carbon structures may be used to help transfer nutrients to plants and increase water retention in soils. The HA product may also have other industrial applications, such as additives for controlling the settling rate of concrete, dyes for leather preparation, agents in the woodworking industry, additives for increasing mechanical strength of ceramics and also medical and environmental applications.

As illustrated in the following Example, processes are provided for high yield production of humic acids from lignite employing oxygen in the aqueous alkaline reaction operating at low temperatures and pressures. The effect of reaction conditions is illustrated so as to enable maximization of the yield and selectivity for production of HA. In select embodiments, optimal temperatures and pressures were respectively 50° C. and >0.517 MPa. The concentration of the extracted humic acids in the liquid phase was measured as a lumped TOC. The isolated HAs were characterized using FTIR, UV-Vis and elemental analysis techniques. The results establish that the extracted humic acids are formed as oxygenated hydrocarbons compounds with oxygen functional groups such as carboxylic, carbonyl, phenolic, functions and their salts that responsible for humic acid analogs. The Example illustrates that the extraction yield depends significantly on the operating conditions, however, no significant effect on the quality of humic acids was evident. The UV-Vis spectral properties of humic acids did not demonstrate a significant difference in E4/E6 ratio. The reaction kinetics mechanism of humic acid production through water-oxygen system are disclosed, and the activation energy for oxygenated lignite was 26.14 KJ/mol.

Examples

Chemicals and Reagents

A coal-lignite sample purchased from VWR, Ontario, Canada was milled to a particle size of 53 to 950 μm using a small jaw crusher device. Potassium hydroxide (KOH, ACS reagent, ≥85%, Sigma-Aldrich, Ontario, Canada), sodium hydroxide (NaOH, VWR, Ontario, Canada), soda ash ($Na_2CO_3$, VWR, Ontario, Canada), and ammonium hydroxide ($NH_4OH$, Sigma-Aldrich, Ontario, Canada) were used to provide an alkaline medium for humic acids formation and used as activation agents. Ultra-high purity oxygen (99.9%, Praxair, Calgary, Canada) was used as the oxygen source. Ultra-high purity nitrogen (99.9%, Praxair, Calgary, Canada) was used for comparison purposes and to illustrate the role of oxygen on humic acids production. Ultra-pure air (99.9%, Calgary, Canada) was used as an oxidizing agent and provide enough pressure for humic acids production. In addition, potassium bromide (KBr, Sigma-Aldrich, Ontario, Canada) was used for the infrared analysis and hydrochloric acid (HCl, Sigma-Aldrich, Ontario, Canada) was used as a precipitant agent. The carrier gas for the GC was helium (99.9% ultra-high purity, Praxair, Calgary, Canada). Commercial humic acids (53680 humic acids, Sigma-Aldrich, Ontario, Canada) was used and characterized for comparison purposes. All chemicals and reagents were used as received without any further purification.

Experimental Procedure of Humic Acids Formation from Lignite

FIG. 1 shows a schematic representation of a process for high yield production of humic acids from lignite. As shown, the main unit is the reactor, which in the exemplified embodiment consists of a 100 mL reactor vessel (model number 4598, Parr Instrumental Company, Moline, Il, USA). The reactor vessel is made of stainless-steel SS-316 with 12 cm in length and 3.25 cm in diameter. The vessel was equipped with a heating oven connected to a temperature control loop, a pressure gauge and a mechanical stirrer with a speed controller. The extractions were carried out at temperatures from 25 to 100° C. and pressures from 50 to 5.2 MPa. In a typical batch, 1.0 g of solid coal sample was charged into the reactor vessel containing 20 g of deionized water and 1.0 g of the alkaline agent such as KOH, NaOH and $Na_2CO_3$. For the case of $NH_4OH$, about 20 mL of 0.1 M $NH_4OH$ was mixed with coal sample. Leak tests were performed by pressurizing the reactor with $O_2$ up to 5.2 MPa prior to fixing the operating pressure. Then, the mixer was set to 1000 rpm to minimize the interfacial mass resistance between the gas and liquid phase. The reactor was then heated to the desired temperature and pressure. Once the desired pressure and temperature are attained, the zero-reaction time was considered. The effects of reaction conditions such as pressure, temperature, time, amount and type of alkaline agent and the coal to water ratio, on the formation of humic acids were investigated following one-variable-at-a-time method. For instance, the effect of pressure was evaluated by changing the pressure from 0.50 to 5.2 MPa at a temperature of 50° C., rpm of 1000 and time of 2 h. All experiments were performed with three replications.

At the end of the reaction, the reactor was cooled down to room temperature. Then, the reactor was connected to gas chromatography, GC (SRI 8610C, SRI Instruments) to analyze the consumed oxygen and any other gases may be emitted during reaction. Afterwards, the liquid phase was carefully withdrawn and filtered for total organic carbon (TOC) analysis using a Shimadzu Total Organic Carbon Analyzer (TOC-L CPH/CPN). The TOC samples were prepared by centrifuging the solubilized species using (Eppendorf centrifuge 5804) at 5000 rpm and 10 min to separate the insolubilized species. All the measurements in TOC and GC were taken three and five times, respectively and the average was estimated with an approximately 5% relative standard deviation.

Extraction of Solid Humic Acids from the Produced Humic Substances

Figure 2:
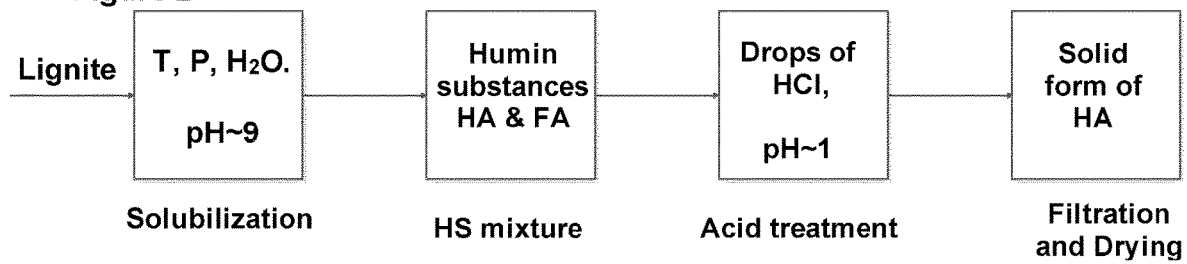
FIG. 2. The schematic diagram for extracting humic acids in solid form.

After extractions under different extraction conditions as described, the produced liquid samples (humic substances) were collected to isolate humic acids (HA) from the solubilized materials. FIG. 2 shows a schematic representation for extracting humic acid analogs in a solid form. After the reaction, the produced solution was carefully discharged and centrifuged (Eppendorf centrifuge 5804) at 5000 rpm for 10 min to separate the remaining solid (i.e., unreacted and/or insolubilized species of lignite). The pH of the filtered liquid solution was measured using a Mettler Toledo PH meter (Mississauga, Canada) and it was ranged between 8 and 10 based on the reaction conditions. The filtered liquid solution, i.e., humic substances, contains fractions of both humic and fulvic acids. By definition, the insoluble fraction in acidified solution (i.e., the fraction of higher molecular weight) is humic acids and the soluble fraction in acidified solution (i.e., the fraction of lower molecular weight) is fulvic acids. The ISO-19822 protocol was applied to separate and isolate the humic acids from the produced humic substances [40]. The HA can be extracted by adjusting the pH of the humic substances (alkaline solution) by adding 6 M HCl (1:1) dropwise to the alkaline extract until the pH is reached to ~1 under gently stirring using a magnetic stir bar in a flask. Then, the flask is covered with parafilm and mixed for 1 h. The pH of the solution can be readjusted to ~1 by adding 6 M HCl after 1 h, if necessary. Once the pH of the solution is stable, the flask is removed from the mixer and covered the flask with parafilm, the solution is allowed to sit undisturbed for approximately 4 h. The coagulation lasted 4 h and then the flocculated HA is dropped out of the solution. Consequently, the precipitated HA was separated by centrifuging at 5000 rpm for 30 minutes followed by decanting the supernatant (Fulvic Fraction). The last step can be repeated at 4000 rpm for 20 minutes to further separate the flocculated HA that appears to precipitate from the liquid fulvic fraction. Eventually, these settled-solid hydrocarbons (HA) were dried in an oven at 62±3° C. for 24 h and then the dried HA is placed in a desiccator to cool before further characterization.

The extraction method used here involves an indirect method where the content of individual fractions of humic substances is determined by estimating the content of each component. As defined earlier, the humic substances (HS=HA+FA) are expressed as a carbon percentage. The yield and selectivity of humic acid production were calculated based on the carbon mass, carbon of the solubilized materials in the liquid phase which was measured as the lumped total organic carbon (TOC) concentrations. The yield of humic acid was measured by the amount of organic carbon in the whole produced solution (HS) as the following equation, $$\text{Yield of } HS, Y\% = \frac{TOC}{C_{Ao}} \times 100 \quad (1)$$

where $C_{Ao}$ is the initial carbon concentration of lignite, TOC is the total organic carbon which represents the amount of carbon in the liquid phase. The content of carbon in lignite was measured by the elemental analysis. Worth noting that the total carbon (TC) is the concentration of both HA and FA in the liquid phase before acids treatment, whereas the values of inorganic carbon (IC) were nail at the optimal conditions (TC=TOC+IC). The content of fulvic acids (FA) was calculated by subtraction of HA content from the HS content. Thus, the selectivity to HA products was calculated as follows, $$\text{Selectivity to } HA\% = \frac{C_{HA}}{TC} \times 100 \quad (2)$$

where $C_{HA}$ is the concentration of isolated humic acids after acid treatment which was measured by TOC.

FTIR Analysis

The chemical structure of the humic acid analogs was characterized using a Shimadzu IRAffinity-1S FTIR (Mandel, USA), provided with a smart diffuse reflectance attachment to carry out diffuse reflectance infrared Fourier transform spectroscopy (DRIFTS) analysis. The background was defined by analyzing about 500 mg of pure potassium bromide (KBr) powder; then, approximately 5 mg of the extracted humic acid samples dispersed in the 500 mg of KBr were analyzed. The IR spectra were obtained in the wavenumber ranging from 400 to 4000 $cm^{-1}$; all the spectra were acquired as averages of 50 scans with a resolution of 4 $cm^{-1}$.

UV—Visible Spectrophotometry Analysis

Humic substances generally show strong absorbance in the UV region from 190 to 800 nm, which depends on the presence of aromatic chromophores and/or other organic compounds [41]. The ratio of optical densities or absorbance of dilute, aqueous humic and fulvic acids solutions at 465 and 665 nm (E4/E6) provides information on the relative proportions between UV-absorbing functional groups and unsaturated compounds [42]. This ratio is independent of the concentration of the humic substances but is characteristic of different natural organic matter fractions of humic substances obtained from different sources [43]. Higher molecular weight with a higher degree of condensation of the aromatic rings is presented by lower E4/E6 ratio value. This lower value of E4/E6 may be largely attributed to the absorption by aromatic=C functional groups. Additionally, some researchers reported another ratio like E2/E3 (for wavelengths of 280 and 360) which reflects a high average molecular weight for the low value [44]. Here, we used the E4/E6 ration to analyze the produced humic acids using Evolution 260 Bio UV—Vis spectrometer (Thermo Scientific, Ontario, Canada). To determine this ratio, around 5.00 mg of isolated solid humic acids were suspended in 100 ml of $NaHCO_3$ 0.05 M aqueous solution before UV-Vis analysis.

Elemental Analysis and Ash Content

The elemental composition (C, H, N) of the isolated humic acids and virgin lignite were measured using a PerkinElmer 2400 CHN analyzer (Waltham, Massachusetts, USA) following a standard high-temperature combustion procedure. The value of oxygen content was calculated by difference. Moreover, the ash content was measured with thermal oxidation using a thermogravimetric TGA/DSC analyzer (SDT Q600, TA Instruments, Inc., New Castle, DE)

by heating the sample from 25 to 800° C. at a heating rate of 10° C./min under air flow of 100 mL/min.

Effect of Reaction Conditions on the Formation of Humic Acids

The effects of reaction parameters on the yield of humic acids such as temperature, residence time, oxygen partial pressure, amount and type of alkaline media, and the ratio of lignite to water were investigated. These parameters were optimized to maximize the yield and selectivity to produce humic acid either in solid form which is expressed as selectivity or in liquid form which is expressed as yield. Preliminary experiments were conducted to optimize the mixing rate. The results revealed that the high mixing rate of 1000 rpm is sufficient to eliminate mass transfer limitations between the gas and liquid phases. Therefore, the mixing rate was kept constant at 1000 rpm in all experiments. Also, enough oxygen partial pressure (>1.5 MPa) was provided during all the experiments to increase the solubility of oxygen in the aqueous solution and thus ensure a strong driving force for the oxygenated reaction.

Effect of Reaction Temperature

Figure 3:
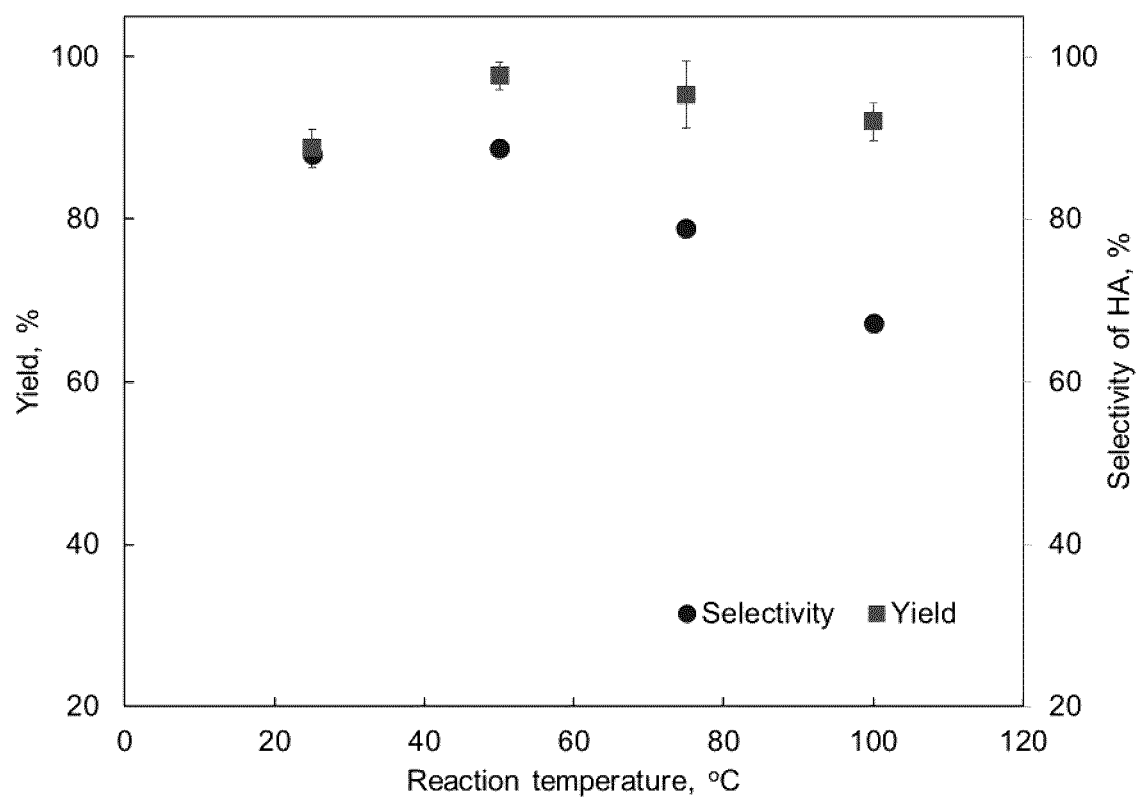
FIG. 3. Effect of reaction temperature on the yield and selectivity of humic acids. Experiment conditions: Pressure is 3.4 MPa, time is 2 h, mixing rate is 1000 rpm and 1.0 g of KOH.

The effect of reaction temperature on the formation of humic acids was illustrated at 25, 50, 75 and 100° C. Other important parameters such as the oxygen partial pressure were set to 3.4 MPa to provide enough oxygen for humic acids extraction, mixing rate was 1000 rpm to prevent the liquid phase interfacial mass transfer resistance, and the residence time was 2 h and 1 g of KOH. FIG. 3 shows the effects of the reaction temperature on the yield and selectivity of humic acids. It is clear that the temperature is the most influential factor in extraction yield and selectivity. As shown, the maximum yield of forming humic materials (HA and FV) is observed at 50° C. where around 96% of lignite was converted to humic acid. Other operating temperatures are somehow providing a constant yield of humic substances with a yield value of more than 92%. However, the selectivity of forming humic acids in a solid form is slightly reduced at high temperature where the maximum is observed at 50° C. At a temperature higher than 100° C., the oxidation reaction would favor the $CO_2$ path, as confirmed by the high emissions of $CO_2$ (4.3 vol %) at 100° C. By increasing the reaction temperature, the conversion of solid hydrocarbon into humic acids is increased, however, the selectivity of producing $CO_2$ gas is increased. Nevertheless, an increase in the temperature should be coupled with shorter extraction times, to avoid further degradation in coal. From these results, to obtain a high yield and selectivity toward the formation of humic acids, a temperature of between about 25 and 50° C. may be selected, as both yield and selectivity were higher than 94%. At this temperature range, more organic functionalities dissolved in water as a result of the polar functionality of the aromatic edges and paraffinic terminal carbons that are incorporated with oxygen, and hence, avoiding being further decomposed and converted to gaseous emissions including $CO_2$.

Without begin bound by theory, these observations provide a model for implementation of optimized embodiments. In particular, the model suggests that the foregoing results can be explained by the physical association of intermolecular forces between oxygen and lignite molecules. Thus, at that reaction temperature such as 50° C., the molecular structures become weak and thereby release HA from the lignite. However, at high temperatures (>100° C.) breakage of the noncovalent bonds may occur, such as hydrogen bonds as well as weakening of covalent bonds (ether bonds and ester bonds), and cleavage of side-chain bonds (aromatic rings and fat bonds) might also take place. Under subcritical conditions, the intermolecular hydrogen bonds of water break down and the dielectric constant of water decreases. The dielectric constant of water at ambient temperature and pressure is 83, thus by increasing the temperature to 50° C., the water dielectric constant is reduced to 68 in addition to the decrease in water polarity, thus the reaction field changes from ionic reaction to radical reaction. Nevertheless, the selectivity of humic acids is decreased with temperature, especially after 50° C., with the possibility of forming CO2 as well as the formation of FA playing a role. At high temperature, the molecule structures of the extracted HA will be reduced by further reaction of the neighboring carboxyl and hydroxyl groups to form a lactone or hydroxy lactone in cyclic esters. This esterification process then makes the molecule more hydrophobic, thus HA can be converted into FA. The more lactones that form within the molecule compared to remaining free carboxyl and hydroxyl groups, the more hydrophobic the compound is, and those molecules that dissolve in n-hexane probably contain only lactones and no carboxylic acid or hydroxyl groups at all. An increase in temperature can cause a higher solubility yet this is accompanied by degradation of polyphenols due to their oxidation. Therefore, a higher temperature corresponds to greater energy consumption which subsequently impacts the cost-effectiveness of the process. Accordingly, about 50° C. is, in select embodiments and in this Example, an optimized reaction temperature.

Effect of Reaction Time

Figure 4:
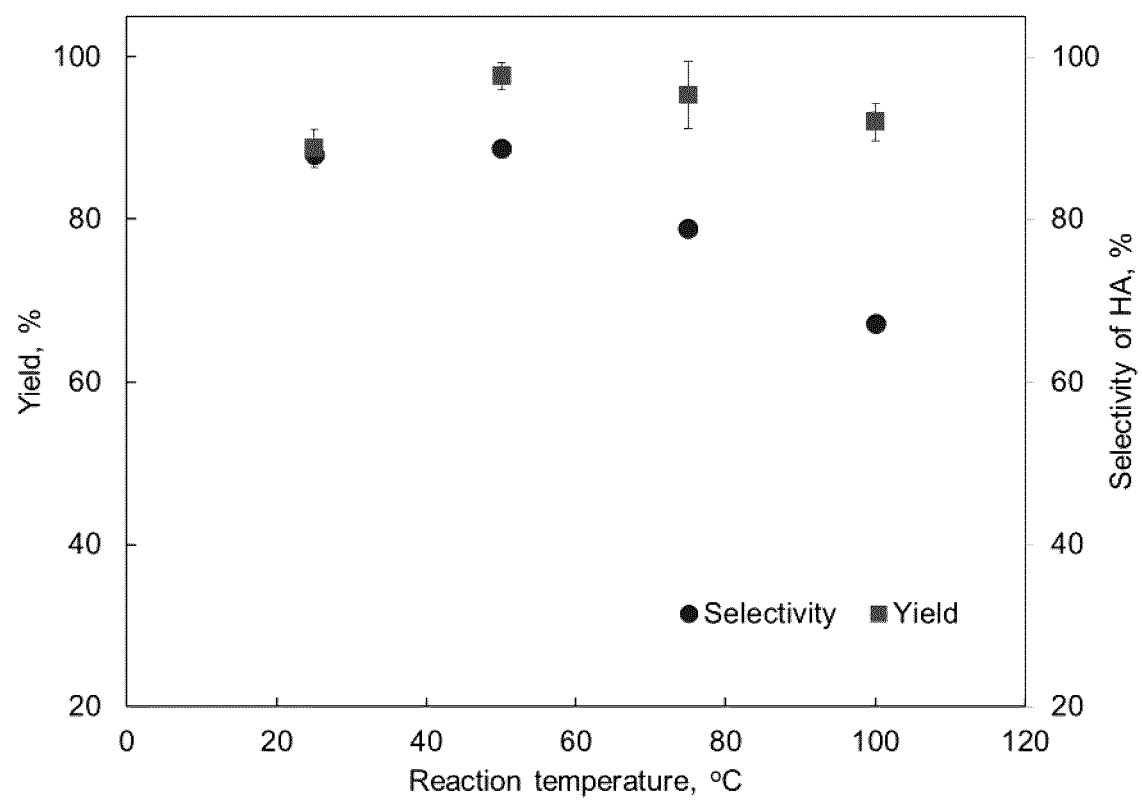
FIG. 4. Effect of reaction time on the yield and selectivity of humic acid formation. Experiment conditions: Pressure is 3.4 MPa, the temperature is 50° C., the mixing rate is 1000 rpm and 1.0 g of KOH.

The effect of reaction times on the formation of humic acids was illustrated by varying the time from 0.25 to 2 h under constant pressure of 3.4 MPa, temperature 50° C., mixing rate 1000 rpm and 1.0 g of KOH. FIG. 4 shows both yield and selectivity of humic acids at different reaction times. As shown, around 80% of humic substances were formed at short reaction times (i.e., <1 h), with no significant changes in both conversion and selectivity at a time less than 1 h. However, the formation of these humic substances is increased to some extent after the first reaction hour. At that time (i.e., 2 h), around 95% of lignite is converted into humic acids which are expressed as either yield or selectivity as shown in the figure. In other words, this high selectivity of HA (95%) shows that the humic materials (solubilized in water) under these reaction conditions are essentially totally converted to HA in solid form after isolation via the acid treatment. Nevertheless, an insignificant increase in HA formation was observed at the shortest reaction time.

Effect of Amount and Types of Alkaline Solution

Figure 5:
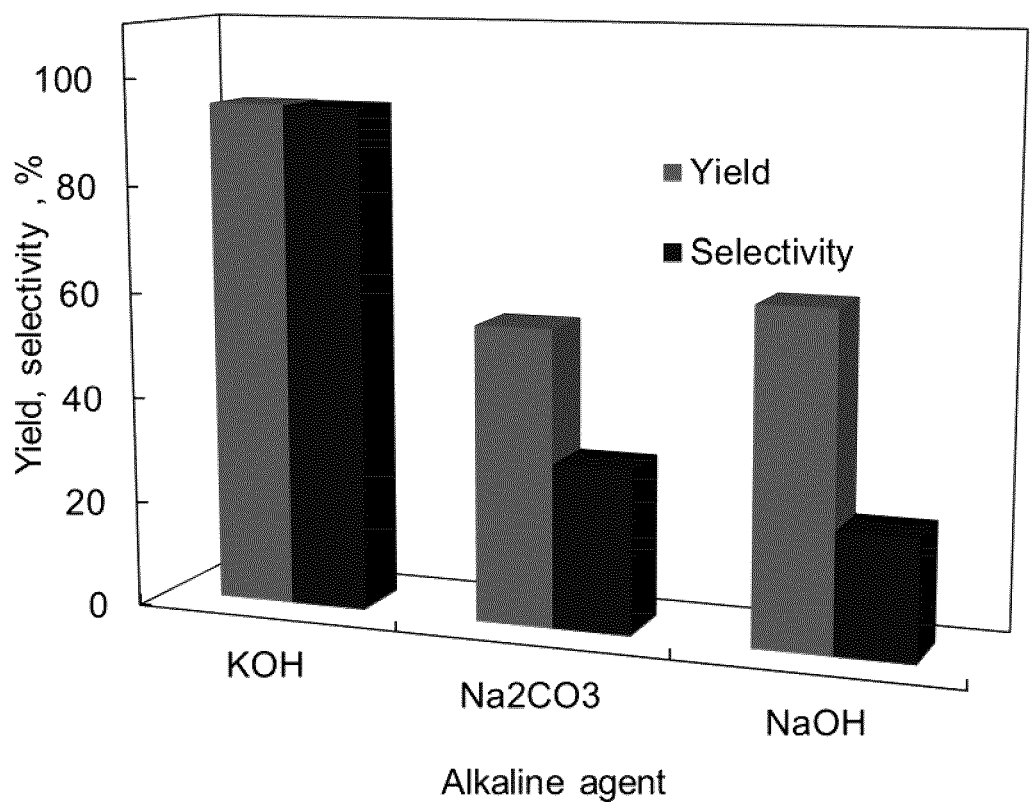
FIG. 5. Effect of base nature on the yield and selectivity of humic acid formation. Experiment conditions: Pressure is 1.7 MPa, the temperature is 50° C., the mixing rate is 1000 rpm and 2 h reaction time. Yield bars are to the left of Selectivity bars.
Figure 6:
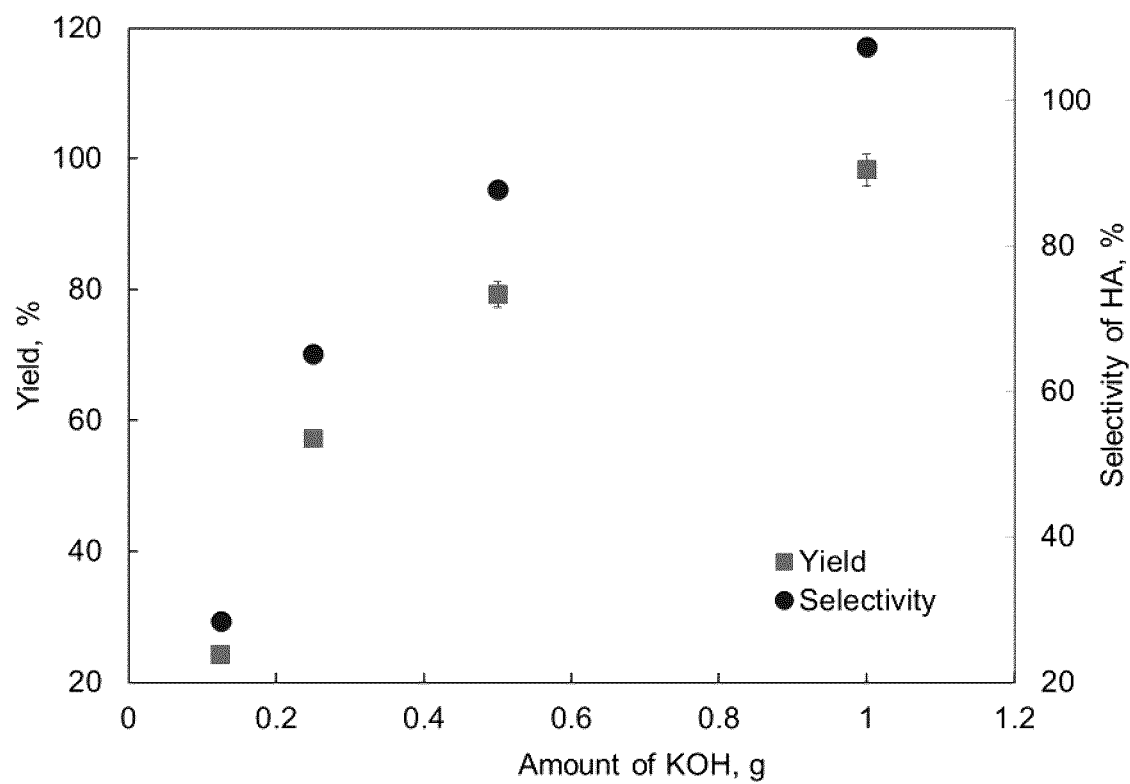
FIG. 6. The effect of KOH amounts on the yield and selectivity of humic acid formation. Experiment conditions: Pressure is 1.7 MPa, the temperature is 50° C., the mixing rate is 1000 rpm and 2 h reaction time.

The effect of different bases such as KOH, NaOH and $Na_2CO_3$ on the formation of humic acids from lignite was illustrated. The exemplified embodiments involved adding 1.0 g of each basic agent to 20 mL water and 1 g lignite at a temperature of 50° C., time 2 h and oxygen pressure of 3.4 MPa. FIG. 5 shows the yield and selectivity of humic acid formation at different alkaline media. As shown, lignite conversion and selectivity of humic acids are base dependent. The KOH provides the highest performance in terms of improving the solubility and selectivity. By adding KOH, 94% of lignite can be converted to humic substances which is higher than that of NaOH and $Na_2CO_3$ where the yields were 63% and 56%, respectively. Similarly, the selectivity to humic acid formation was around 94% using KOH whereas around 23 and 31% were obtained for NaOH and $Na_2CO_3$, respectively. Therefore, a determining factor influencing the degree of humic acid extraction from lignite and its structure is the type of extractant. Where the largest efficiency, yield and selectivity, (about 94%) was obtained with the use of KOH solutions. Moreover, the effect of KOH concentration on the solubility (yield) and selectivity of humic acids was illustrated by changing the dosage of KOH from 0 to 1 g at constant temperature (50° C.), oxygen pressure (1.7 MPa), reaction time (2 h) and mixing speed (1000 rpm). FIG. 6 shows the effect of KOH dosages on the yield and selectivity of humic acids. As seen, the formation of humic acids is significantly increased by increasing the amount of KOH.

Effect of Lignite to Water Ratio

Figure 7:
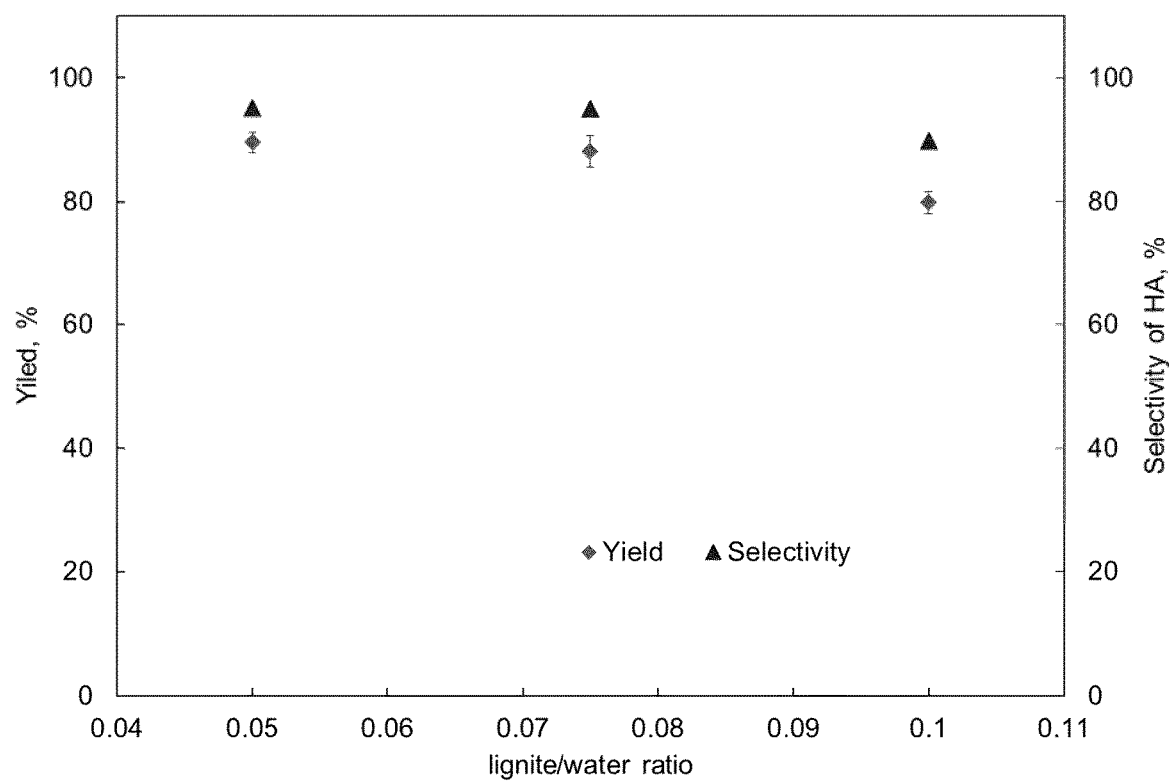
FIG. 7. Effect of lignite mass on yield and selectivity of humic acid formation. Experiment conditions: temperature is 50° C., reaction time is 2 h, pressure 1.7 MPa, and the mixing rate is 1000 rpm.

FIG. 7 shows the yield and selectivity of humic acid formation at a different mass ratio of lignite to water. The reaction experiments were conducted at the optimal conditions where the temperature is 50° C., pressure is 1.7 MPa, time is 2 h and 1 g of KOH. As shown, a slight decline in lignite conversion to humic acids was observed with increasing the coal mass to water ratio especially at high ratio of 0.1. At a low ratio of lignite to water (i.e., 0.05 and 0.075), no changes can be observed in both yield and selectivity to humic acids, they were almost constant. A similar trend is presented for the selectivity of HA. At high ratio (i.e., 0.1), lignite conversion to humic acids decreased probably due to the insufficient amount of water available for solubilization and saponification-like reactions. This favors aggregation of lignite particles and limits their reaction with oxygen inside the reactor, and thus increases mass transfer resistance and thereby limits the reaction rate. Hence, for a higher yield and conversion, an optimal amount of lignite to water is required.

Effect of Pressure

Figure 8:
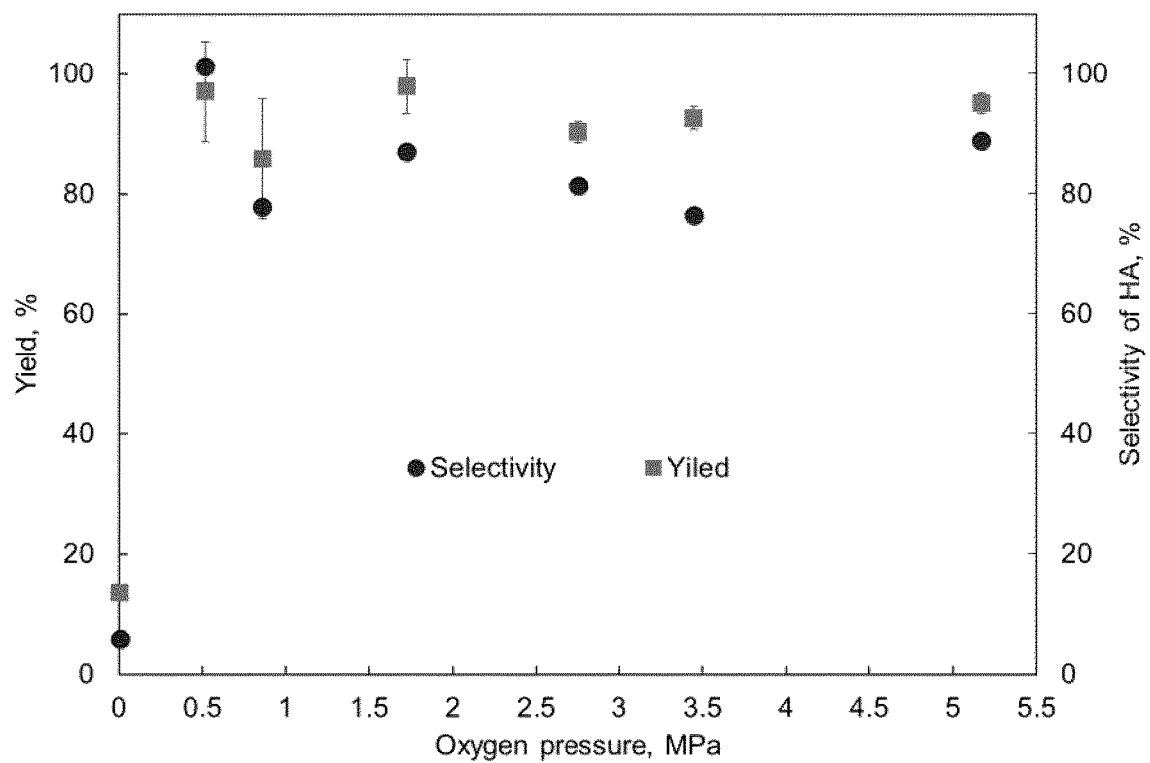
FIG. 8. Effect of oxygen pressure on the yield and selectivity of humic acids formation. Experiment conditions: temperature is 50° C., reaction time is 2 h, and the mixing rate is 1000 rpm.

The oxygen pressure was altered between 0.34 and 5.17 MPa to illustrate the effect of pressure on the production of humic acids, keeping temperature and residence time (50° C., and 2 h) fixed. FIG. 8 shows the yield and selectivity of humic acid production at different oxygen partial pressure. As shown, at atmospheric pressure the conversion of lignite to the HA was very low (~13%), then a sudden increase in the conversion was noticed when a little oxygen pressure (0.517 MPa) was supplied to the reaction before leveling off after that. These findings indicate that there is a significant effect of pressure after 0.517 MPa on conversion of lignite into humic acids. This range of reaction conditions (i.e., pressure and temperature) provide subcritical water characteristics so that water will remain in the liquid phase during the reaction. Under these conditions, the dielectric constant of water changes dramatically with the change in temperature and pressure. At a temperature of 30° C. and a pressure of 0.1 MPa, the relative permittivity of water is 79.6, due to the strong dipole-dipole electrostatic interactions between individual molecular dipoles. As the temperature and pressure increase, increasing thermal energy causes increasing disorientation of molecular dipoles, with a consequent decrease in relative permittivity [56]. Therefore, the working pressure was always higher than the equilibrium water vapor pressure in all the present examples. This demonstrably enhances the solubility of lignite in water. The selectivity for humic acid formation did not change significantly with pressure, hence, in select embodiments it is beneficial to work at low pressures under optimum reaction conditions for maximizing humic acid production. To confirm the role of oxygen pressure in the formation of humic acids, a control example without oxygen was performed at 50° C. under nitrogen gas for 2 h to determine whether oxygen pressure causes additional effects over the extraction of humic acids. The results showed that no change in lignite conversion was observed after the reaction completion. However, the aqueous phase showed a bright yellow color and the TOC results showed that the conversion was less than 15%, which indicates that only small amounts of lignite were dissolved in the liquid phase. The foregoing illustrates that the presence of oxygen is a curial step for functionalizing the carbon backbones of the lignite, and converting humic substances into acids such as carboxylic and phenolic acids. In addition, since the reaction takes place in a basic medium, these functional groups will combine with their K-salts which promotes the solubilization of the oxygenated hydrocarbons in water.

Characterization of Humic Acids

IR-Analysis

Figure 9:
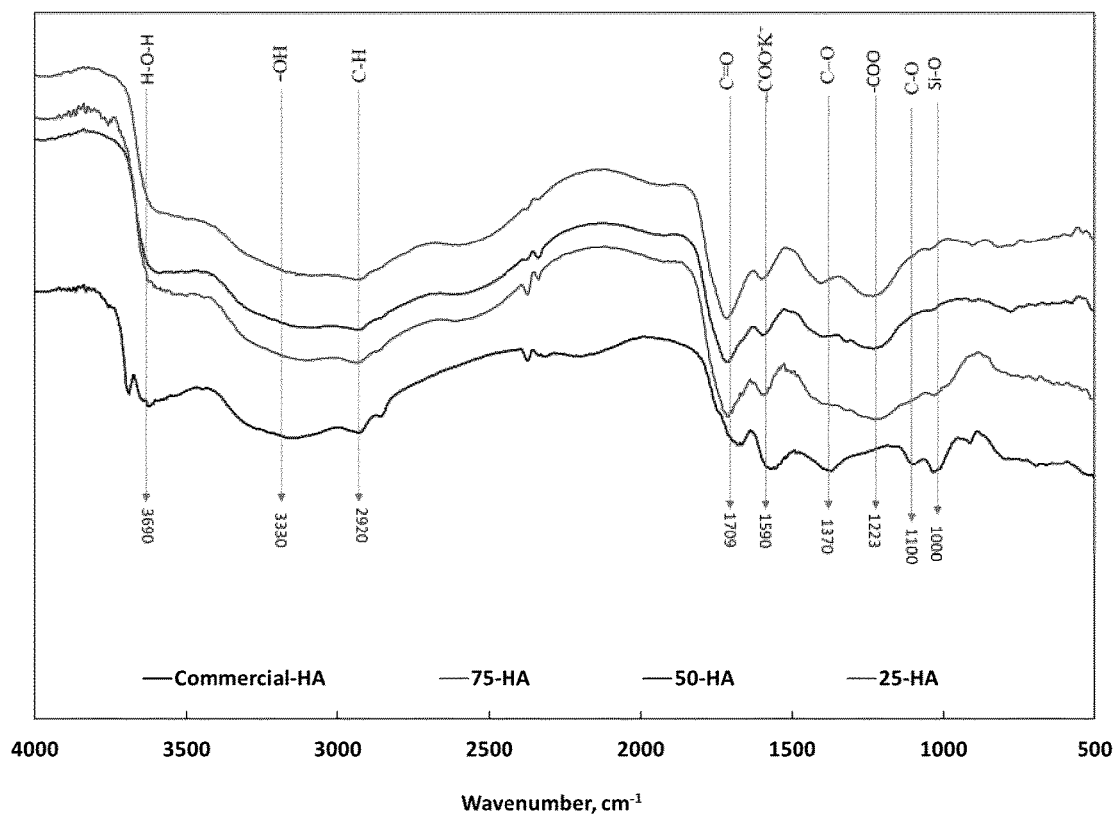
FIG. 9. Comparison of FTIR spectra for humic acid analogs produced at different reaction temperatures and commercially available humic acids, where the plots are from top to bottom: 75 HA, 50 HA, 25 HA and Commercial HA.

The infrared region obtained by vibrational excitation of chemical bonds for produced humic acids analogs at different reaction conditions were investigated by comparing their molecular bonds and functional groups distribution using FTIR. The effect of each reaction condition was studied in the quality and characteristic of humic acids such as reaction temperature, time, oxygen pressure, amount of KOH, and water to lignite ratio. The effect of the reaction temperature of 75, 50, and 25° C. on the chemical functionality of produced humic acids are presented in FIG. 9. The figure also compares spectra of produced humic acids with a commercial one obtained from Sigma-Aldrich. It is clear that the spectra of the produced humic acid analogues are most likely representing the commercial humic acids which are also exhibited similar absorption bands as reported elsewhere [23, 57, 58]. As shown, the broadband centered in ~3300 $cm^{-1}$ indicates the presence of O—H stretching of phenol and alcohol in all samples. This region (3600 to 3030) could be attributed to the hydrogen bond-associated —OH stretching or —NH stretching vibration absorption peaks in phenolic and carboxylic acid structures [59]. However, the weak sharp band at 3690 $cm^{-1}$ can be attributed to the valence vibration of water which is more important for humic acids produced at 50° C. and commercial one. The presence of aliphatic C—H bonds was confirmed by weak stretching vibration absorption bands between 3000 and 2850 $cm^{-1}$. Another important feature is the presence of carboxylic acids (C=O) at 1708 $cm^{-1}$ band in all samples of humic acids analogs which also exist for the commercial acid; however, it is overlapping another band in the same spectral region. The sample band at ~1800 $cm^{-1}$ presents in humic analogs might suggest the possibility of forming carbonyl compounds such as esters and lactones, which is insignificant in the commercial humic acid sample [34]. The strong band at 1590 $cm^{-1}$ could be mainly attributed to protonated carboxylic acids (—COOH), carboxylate anion (—COOK), and ester carbonyl (—COOR) groups, more dominant in the commercial humic acids. A small strong peak can be observed in the commercial sample only at 1370 $cm^{-1}$ which is attributed to the C—H stretching of methyl or methylene groups and/or to the deformation of the hydroxyl group and the C—O stretching vibration of a phenolic hydroxyl group. An important difference between the commercial humic acid sample and the produced humic acid analogs is the presence of ester group (—COO) in the last one which is confirmed by the band at 1223 $cm^{-1}$, stronger at high temperature. Another important difference can be observed in the low-intensity bands from 1100 to 1000 $cm^{-1}$ attributed to Si—O stretching and C—O stretching of polysaccharides which are more important in the commercial humic acids [23]. Worth noting that the spectra of HA analogous at high reaction temperature do not show an absence of alkyl bonds, like in the case of commercial humic acids, however, a slight increase in the oxygen contribution like in O—H can be observed at the low temperature of 25° C. Moreover, the presence of aromatic compounds is also confirmed in all HA samples within the range of 900 to 700 $cm^{-1}$, even at high temperatures, which presents the deformation vibration of the aromatic ring out of the CH plane [60]. It can be concluded that all the obtained spectra at any reaction temperature are approximately the same, mostly O functions were visible. These functionality groups such as hydroxyls and C=O groups can be observed in the commercial humic acids.

Figure 10:
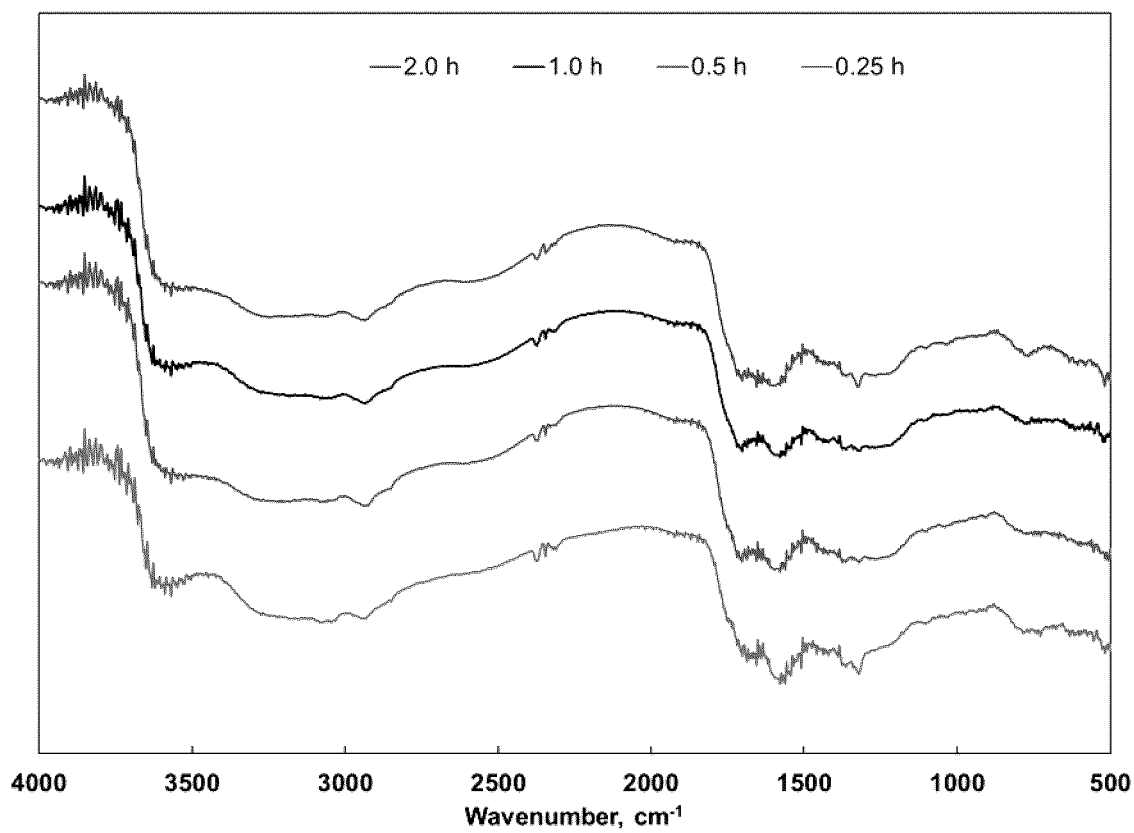
FIG. 10. FTIR spectra of humic acid analogs obtained at different reaction times at a temperature of 50° C., where the plots are from top to bottom: 2.0 h, 1.0 h, 0.5 h and 0.25 h.

Similar spectra were obtained at different reaction times of 0.25, 0.5, 1 and 2 h as shown in FIG. 10. It is clear that the IR spectra of the humic acids analogs obtained at different reaction time show significant contributions of —OH centered in 3400 $cm^{-1}$ and the C=O bonds vibrations at 1700 $cm^{-1}$. In other words, the oxygen molecules have introduced substantial carboxylic function over lignite structures. The presence of aromatic in all cases is evidenced by the C=C stretch band appearing at 1600 $cm^{-1}$. It can be concluded that-OH functionality is significant in all compound samples, aromatics still stay in the samples, and carboxylic acids remain constant with time.

Figure 11:
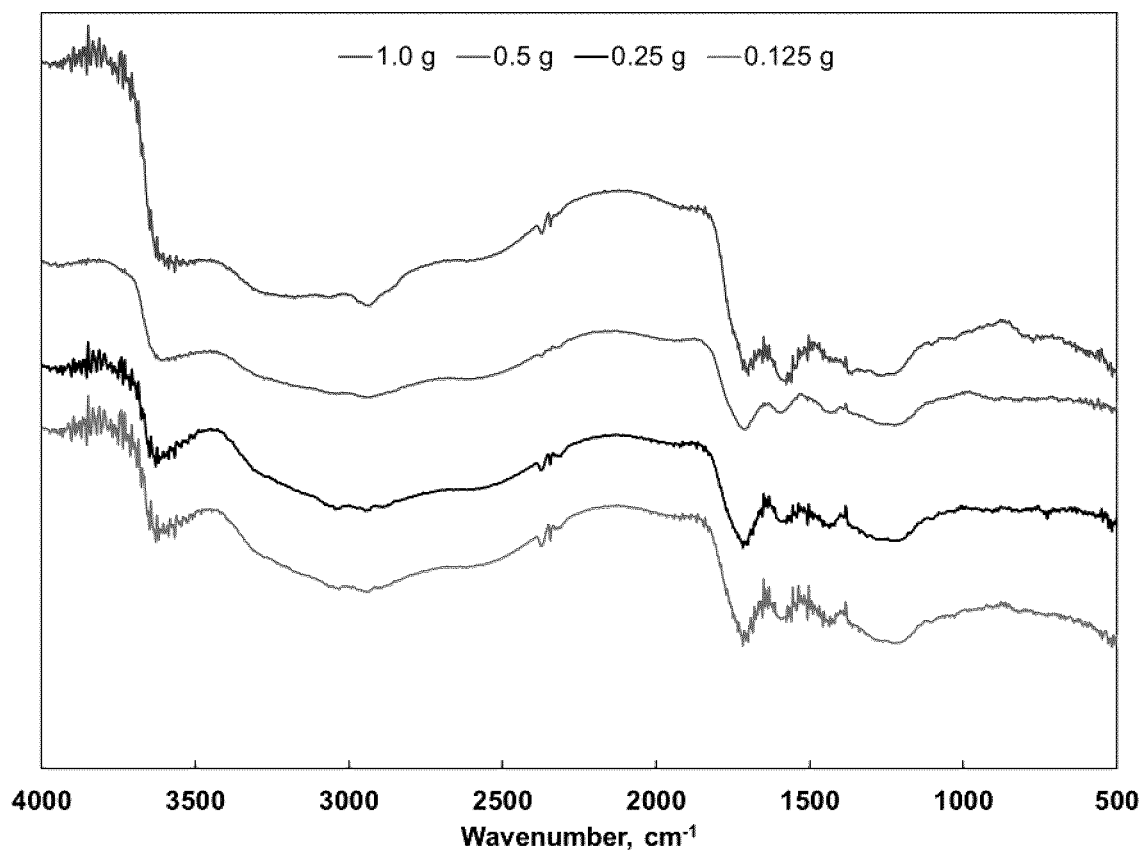
FIG. 11. Effect of KOH dosage on the formation of humic acid, where the plots are from top to bottom: 1.0 g, 0.5 g, 0.25 g and 0.125 g.
Figure 12:
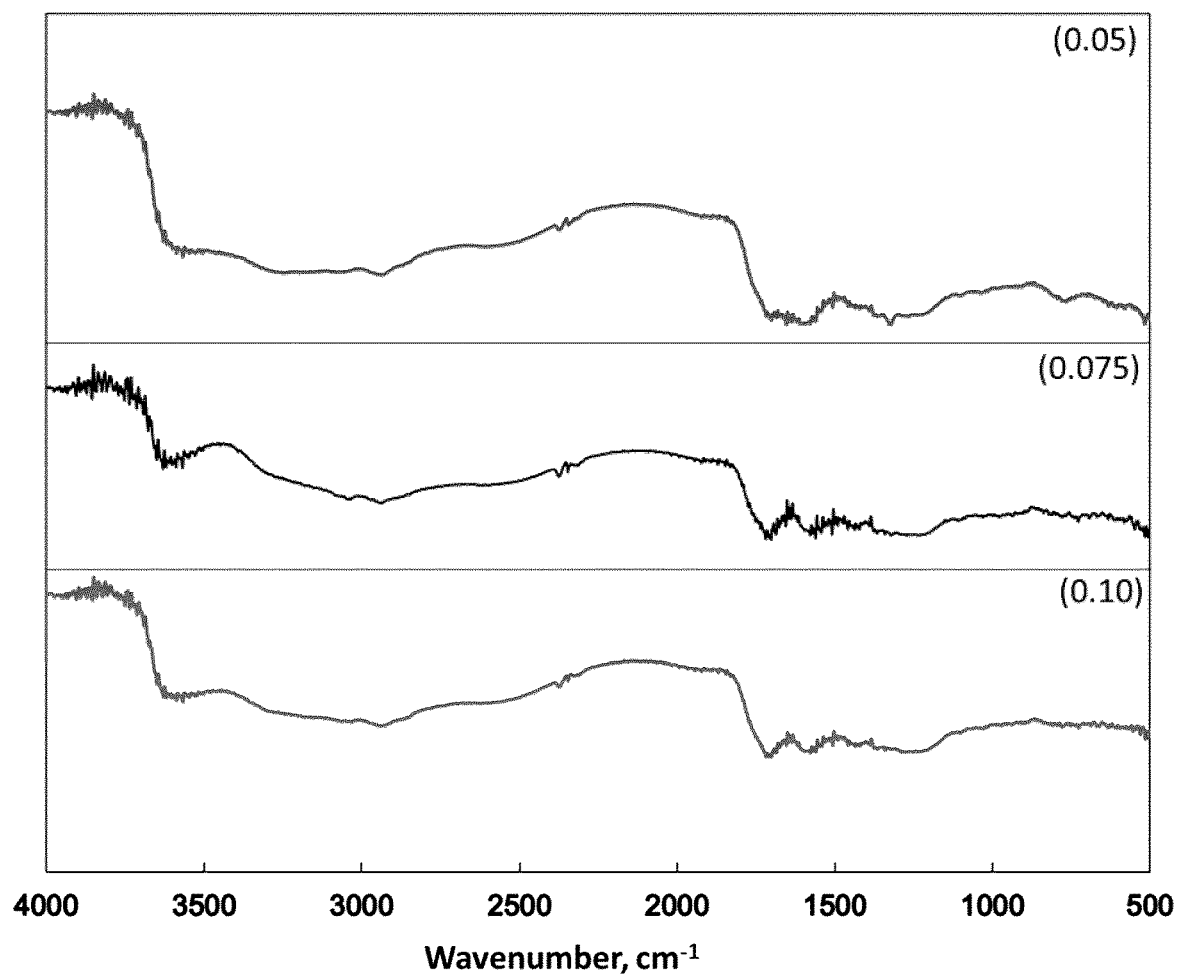
FIG. 12. IR-spectra of humic acids analogs obtained at different lignite to water ratios.
Figure 13:
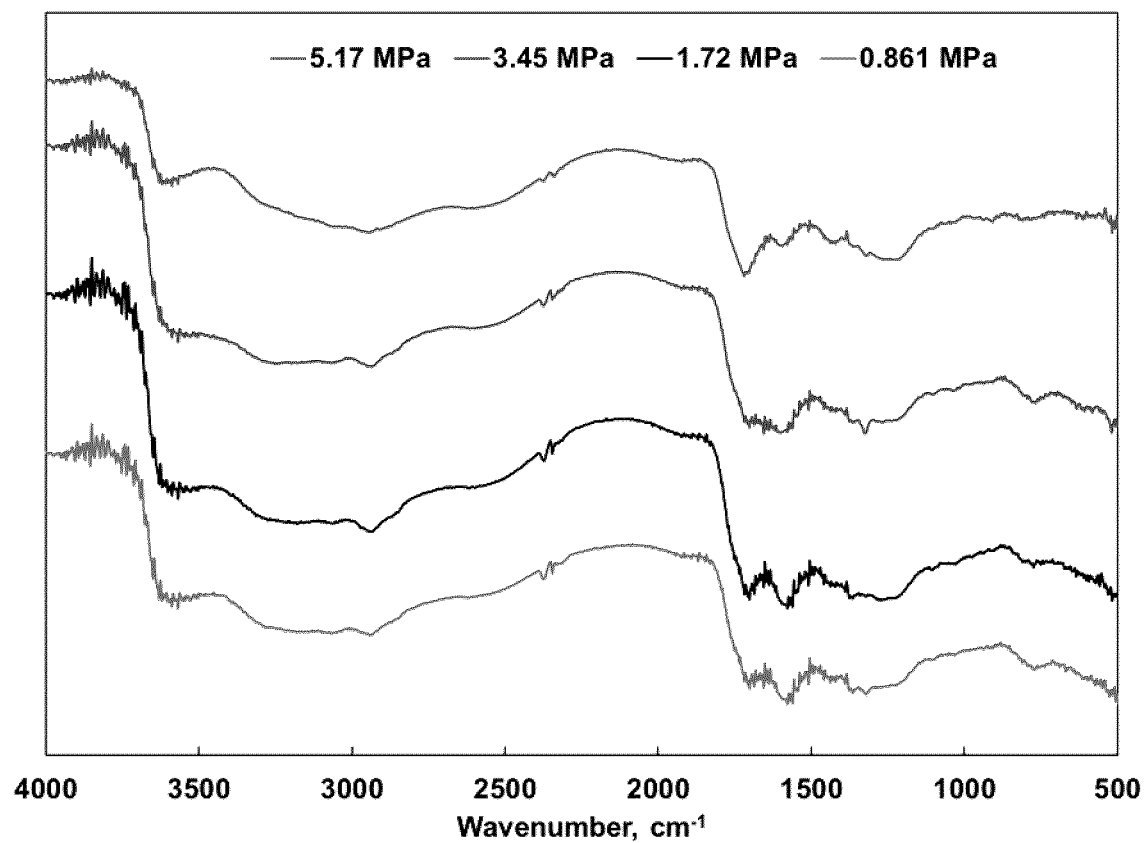
FIG. 13. IR-spectra of humic acid analogs obtained at different oxygen partial pressures, where the plots are from top to bottom: 5.17 MPs, 3.45 MPa, 1.72 MPa and 0.861 MPa.

Moreover, the effect of KOH dosage on the chemical structure of produced humic acids is presented in the IR spectra as shown in FIG. 11. As seen, the broadband spanning from 3700 to 2500 $cm^{-1}$ indicates the presence of OH stretching vibration mode of hydroxyl functional groups in all samples. These functionality groups are formed due to the presence of oxygen in the aqueous phase and are related to oxygenated species such as carboxylic, alcoholic, and phenolic functional groups. An important feature that can be observed at a low dosage of KOH corresponds to —OH in phenolic compounds which are slightly higher than that of high dosage. The presence of carboxylic acids (C=O) is evident as indicated by the band centred at 1710 $cm^{-1}$ in all samples; however, they are more intensive at a low dosage of KOH compared with other samples. The presence of carboxylate anion is observed as a doublet band centered at 1500 $cm^{-1}$, indicating the presence of carboxylic salts in all samples. The presence of C—O—C and/or sulfonic bands (1360-1100 $cm^{-1}$) are also observed in all samples with less intense at a high dosage of KOH (0.5 and 1.0 g) compared to the low amount of KOH samples. It can be concluded that the humic acids extracted with different dosages of KOH exhibited closer similarity, suggesting an interrelated structure. Similar findings can be observed at different oxygen pressure shown in FIG. 12. As shown, the spectra of the produced humic acids are identically at all operating pressures. Likewise, in FIG. 13, the coal to water ratio does not have a significant effect on the formation of humic acids. The humic acids produced with NaOH and $Na_2CO_3$ demonstrated a similar pattern on the IR spectra to one produced by KOH. These findings indicate that the operating conditions for extraction of the humic acids from lignite do not affect the quality of humic acids instead they have a significant effect on the quantity of produced humic acids.

UV—Vis Spectrophotometry

To provide additional insights into the average molecular weights of produced humic acids analogous, the extracted humic acid samples under different reaction conditions were analyzed using UV—visible spectrophotometry, a standard method used in soil science for evaluating molecular weights of humic substances and expressing the degree of humification. This is expressed as the E4/E6 ratio, absorption at 400 and 600 nm, which is inversely proportional to the molecular weight of humic acids. A low ratio may be indicative of a relatively high degree of condensation of aromatic constituents while a high ratio infers the presence of relatively more aliphatic structures. It has been reported that this ratio (E4/E6) does not depend on the concentration, but depends on the carbon and oxygen contents, and amount of COOH groups. It has been suggested that the content of aliphatic and aromatic molecules in extracted humic acids does not play a role in its effectiveness as a soil conditioner [61]. Nevertheless, it may be a useful indicator for the molecular size, because the smaller molecular size is anticipated to perform more effectively in regulating plant growth and nitrate uptake [62].

Figure 14:
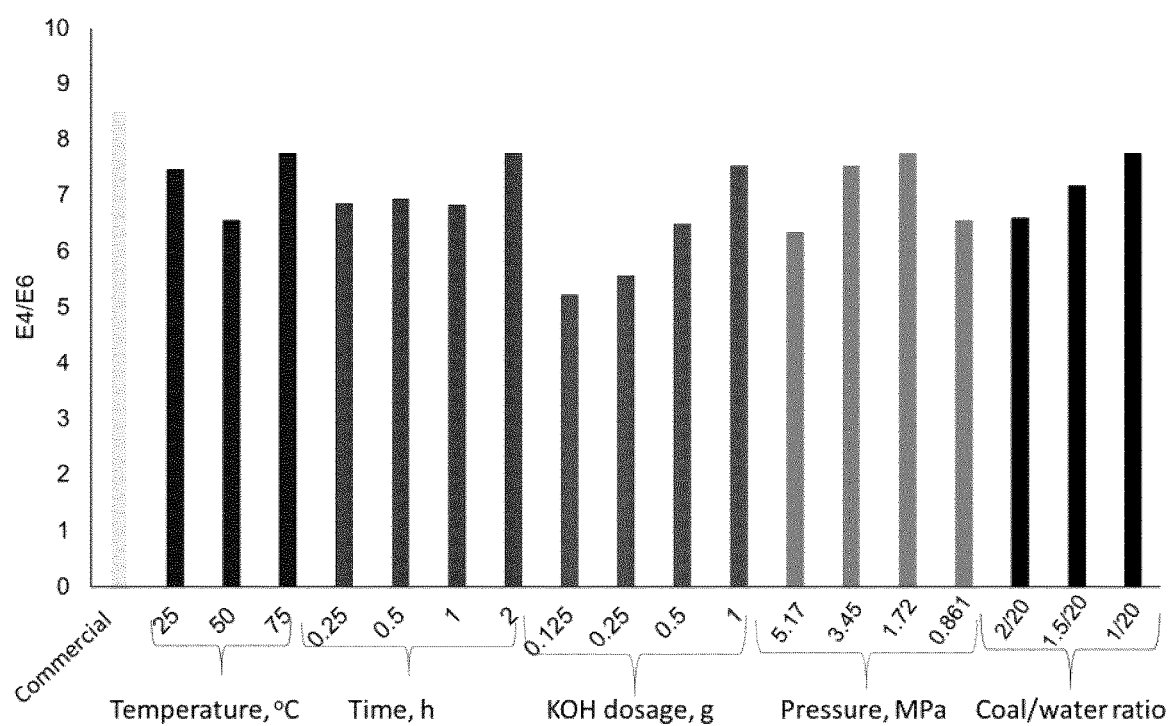
FIG. 14. The E4/E6 ratio of the extracted humic acids analogous produced at different reaction conditions.

FIG. 14 shows the E4/E5 for the extracted humic acid samples at different reaction conditions. The results revealed that the E4/E6 ratios for all samples are spanning from 6 to 9 except the sample with a low dosage of KOH which showed around 5. In another word, the E4/E6 ratios were higher than 6 in the humic acids obtained with carbon conversions higher than 80%, which is characteristic of humic acids with low molecular weight components. Worth noting here that the E4/E6 ratio for commercial humic acids was 8.5 which is similar to the value of our produced humic acids. The results of E4/E6 ratios for the produced humic acids have almost similar values, as shown in the figure, suggesting the similarity in the degree of condensed aromatic system, molecular weights, particle size and acidity of these organic compounds which are consistent with the results of the infrared spectra analysis and indicated that humic acids contained more oxygen-containing functional groups. In addition, the results confirm that the quality of humic acids is not significantly affected by changing the reaction conditions. These results are in good agreement with the E4/E6 ratios reported in the literature for soil humic acids [63]. Nevertheless, Kononova et al. reported that the ratio of humic acids around 5.0, and it was stated that the humic acids are less condensed than lignite humic acids. In another study, the ratio of humic acids was high which reveals the presence of large quantities of aliphatic structures and low quantities of condensed aromatic structures [64]. Some research groups reported that this ratio is not proportional to the degree of aromaticity, particle size, molecular weight and acidity [65]. For the agricultural application, the higher degree of humification in the fertilizers is predictable to have better agronomic quality. However, the differences of in the absorption properties of humic acids (E4/E6 ratio) are not significant enough to enable this parameter to be used as an indicator of a humification degree.

Elemental Analysis

Table 1 shows the elemental analysis of lignite and the produced humic acids optimal different reaction temperature (50° C.) and pressure (0.69 MPa). The results showed that the carbon content in the humic acid sample is slightly higher than average compared with virgin lignite. In addition, higher oxygen content can be found in the humic acid sample compare with the virgin lignite. The high O/C ratio in the humic acid sample can be due to oxygen incorporating during the reaction. Under optimal reaction conditions, more oxygenated hydrocarbons were produced with reaction conversion of ~ 94% at 50° C., thus increasing their oxygen content. Also, the H/C ratios of produced humic acids are somehow less than that of virgin lignite, this reduction refers to the more protonated of humic acids than virgin one. This also implies that aliphatic carbon may be more rich in the produced humic acids [66]. Interestingly, the ash content in the produced humic acids is much less than that of virgin lignite. It is worth noting that the obtained values for C, N, H and O contents are within the range observed for different coal HA's [60].

TABLE 1

Elemental analysis of virgin lignite and humic acids obtained at the optimal reaction temperature and pressure (50° C. and 0.69 MPa).

| Wt % | Lignite | Humic acids | Commercial HA |
|---|---|---|---|
| C | 56.11 | 57.16 | 37.42 |
| H | 5.21 | 4.16 | 3.41 |
| N | 0.98 | 0.58 | 1.02 |
| O* | 32.15 | 36.10 | 24.92 |
| H/C | 0.09 | 0.07 | 0.09 |
| O/C | 0.55 | 0.63 | 0.66 |
| Ash | 5.54 | 2.01 | 33.23 |

*Calculated by difference.

Lumped Reaction Kinetics

To further illustrate the reaction mechanisms of HA production from coal-lignite, the reaction kinetics was investigated and reported as a carbon-based material. Generally, the commercial oxidation processes to produce humic acids from lignite are mainly through liquid-phase oxidation using oxidants such as hydrogen peroxide ($H_2O_2$), nitric acid ($HNO_3$), and potassium permanganate ($KMnO4$) [28]. Some studies have reported that carbon content has no significant difference for nitric acid and hydrogen peroxide oxidation for the humic acids of lignite [67, 68]. However, in our case, the lignite was oxidized under oxygen in the water phase similar to the wet air oxidation process, but at low temperature. In this case, the produced humic acids in water-oxygen system through oxidation of lignite is not completely oxidizing the carbon atoms into carbon dioxide, but instead, increasing the oxygen functionality groups in the produced materials at our operating conditions (25-75° C.). Therefore, increasing the acidic functionalities in the produced humic acids. These partial oxidation steps related to the cleavage of the condensation linkages which lead to the formation of humic acids with abundant functionalities during the solid-phase activation conditions. Such high level reaction mechanism is presented in the following equations:

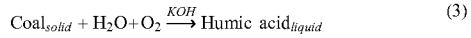

$$Coal_{solid} + H_2O + O_2 \xrightarrow{KOH} \text{Humic acid}_{liquid} \quad (3)$$

$$(CHNSO)_s + H_2O + nO_2 \xrightarrow{k} (CHNSKO_m)_l + (n-m)O_2 \quad (4)$$

where K is the reaction constant, n is the number of moles for oxygen, m is the moles for oxygen that incorporated in the humic acids, $(CHNSO)_s$ is the chemical formula of solid coal-lignite, and $(CHNSKO_m)_l$ is the chemical formula of produced humic acid in liquid form.

During the reaction, the lignite molecules are activated with the alkaline solution through a saponification-like reaction and then the complex compounds from the activated lignite is partially solubilized in water before it reacts with oxygen to produce high polar and oxygenated compounds. These formed complex compounds are mainly aliphatic-aromatic compounds and some oxygen functionality groups like carboxyl. Under alkaline conditions, these molecules are further converted into water-soluble humic acids, thereby increasing the stability of the system.

Figure 15:
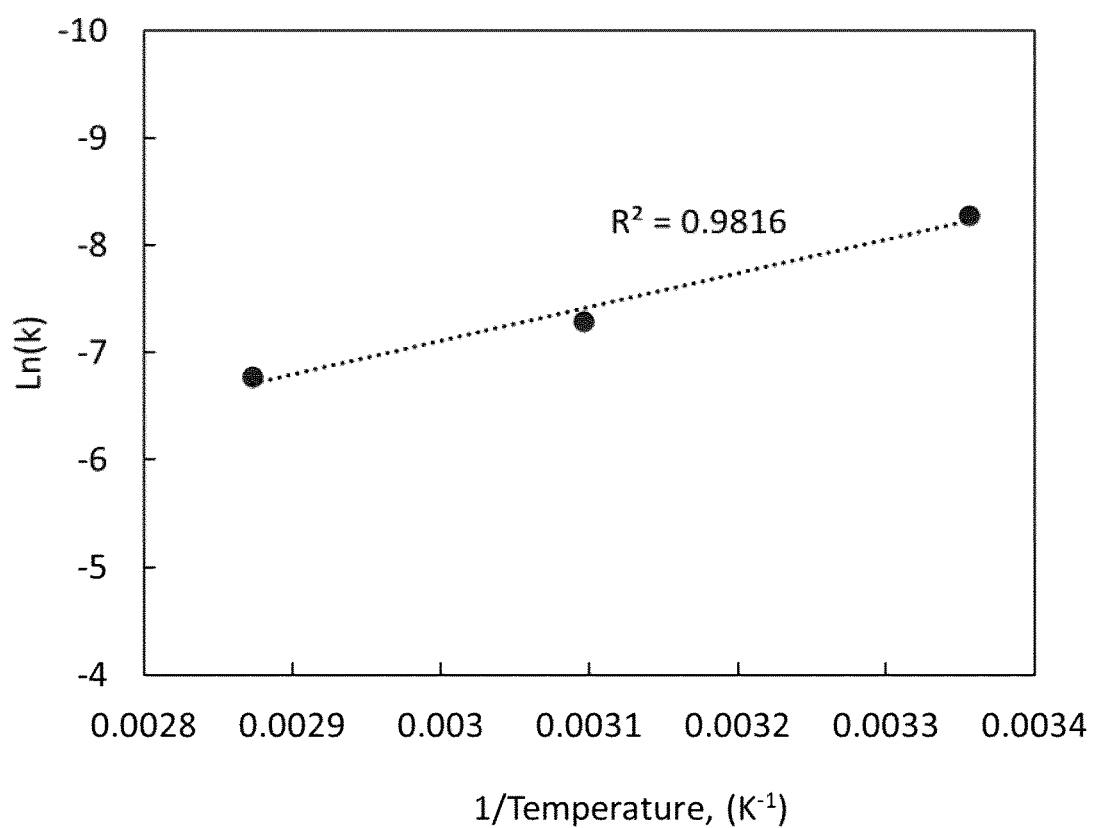
FIG. 15. Arrhenius plots at different reaction temperatures for formation of humic acids in water-oxygen system.

Based on Eq. 4, the net reaction rates for producing humic acid compounds (B) by the reaction of lignite with alkaline water-oxygen system can be described from the elementary lumped reactions and are expressed as follows;

$$\frac{dC_A}{dt} = -KC_A \quad (5)$$

$$\frac{dC_B}{dt} = KC_A \quad (6)$$

where $C_A$ and $C_B$ are the carbon concentration in virgin lignite and formed humic acids in water. K is the reaction rate constant, and t is the reaction time. The reaction kinetic parameter of this reaction (K) and the reaction order presented in Equation (5) were estimated by fitting the experimental data obtained at different reaction temperatures and time with equations 5 and 6 using the Mathematica software (V12.0). Because excess oxygen was provided to the system, a zero-order reaction was considered for the oxygen. However, the reaction order for decomposing lignite (A) was determined as a first-order. Worth mentioning that the carbon concentration in the solid lignite ($C_{Ao}$) at the beginning of reaction was determined using elemental analysis whereas the concentration of humic acid in the water phase ($C_B$) during the reaction was determined as TOC. In this example, based on the optimized conditions presented in the previous section, the experimental kinetic data were collected at temperatures of 25, 50, and 75° C. along with the reaction times 0 to 120 min. However, other operating conditions are fixed. For example, oxygen partial pressure was fixed at 1.7 MPa as there is no significant effect on the reaction that was observed beyond this value as shown in FIG. 8. The mixing rate was also fixed to 1000 rpm during the reaction to avoid mass transfer limitation. The mass ratio of lignite to KOH was fixed to 1:1 as the maximum conversion and selectivity were achieved at this ratio. These reaction conditions, temperature, pressure, the amount of KOH and mixing speed, were found to be the optimal reaction conditions for the high yield of humic acids. After applying these experimental data in the reaction model, the resultant reaction rate constants for humic acids at different reaction temperatures along with the apparent activation energies and frequency factors after applying the Arrhenius equation are presented in Table 2. FIG. 15 shows the Arrhenius plot for reaction constants obtained at three reaction temperatures. The curve shows a good linear fitting for correlation coefficient with R2 value close to 1. As presented in Table 2, the values of reaction constants are increased with the reaction temperature, thus confirming the significant effect of operating temperature in producing the humic acids. The results also show that the activation energy of forming humic acids is 26.14 KJ/mol, and this energy is required to activate the lignite structure by allowing oxygen to incorporate in their structure, thus formation of humic acids analogous. This activation energy may also indicate the possibility of disaggregation of graphene-sheets in the alkaline solution.

TABLE 2

Estimated values of the reaction kinetic parameters, rate constants, activation energies and frequency factors.

| Temperature, °C. | Reaction constant K, s$^{-1}$ | Activation Energy, kJ·mol$^{-1}$ | Frequency Factor, s$^{-1}$ |
|---|---|---|---|
| 25 | 2.54 × 10$^{-4}$ | 26.14 | 10.25 |
| 50 | 6.84 × 10$^{-4}$ | | |
| 75 | 1.145 × 10$^{-3}$ | | |

Figure 16:
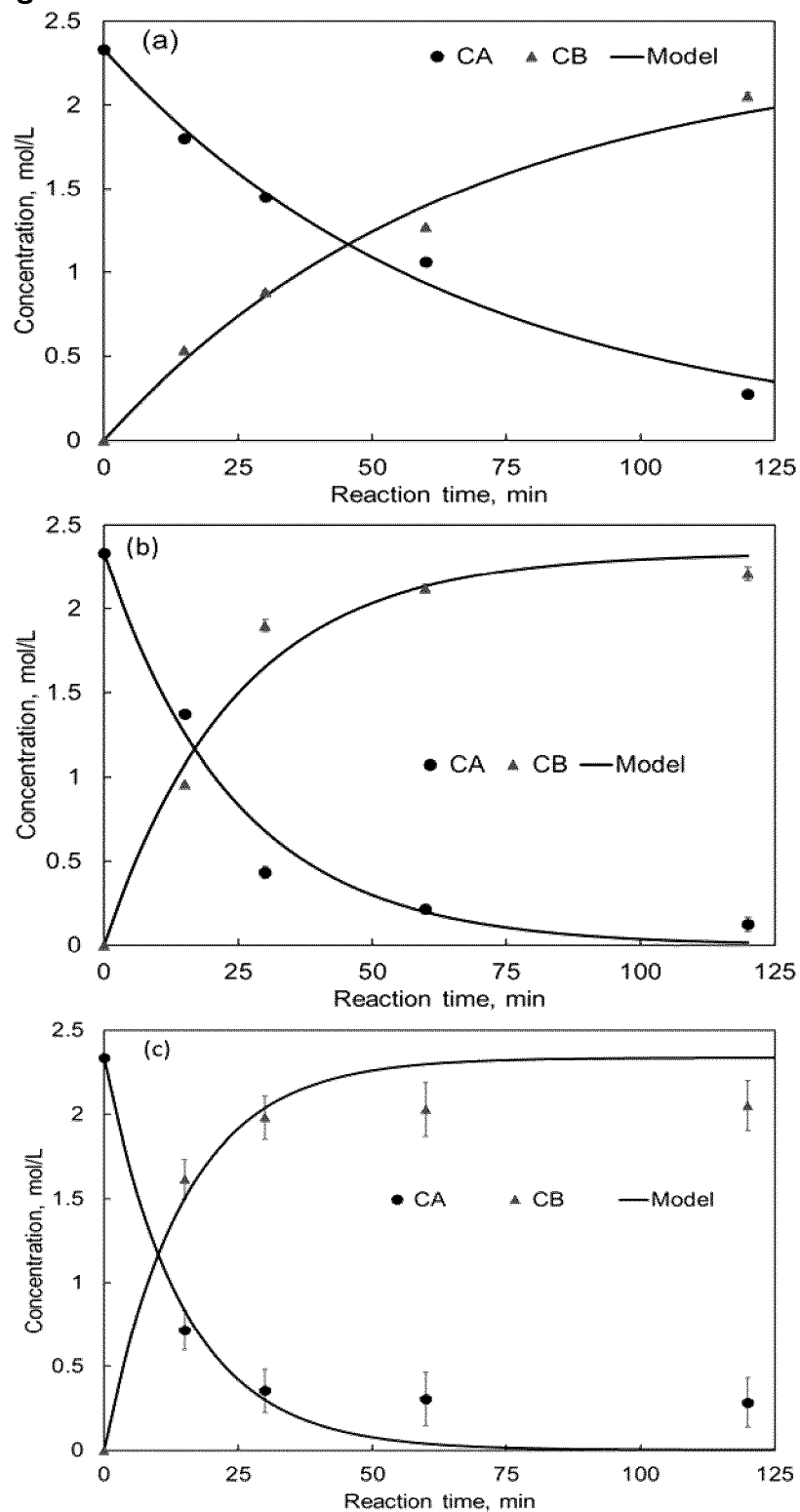
FIG. 16. Concentration profiles of lignite (A) and humic acids (B) over the reaction times and different reaction temperatures of a) 25° C. B) 50° C., and c) 75° C. The symbols represent experimental data, and the solid lines are the reaction kinetics model.

FIG. 16a, b, and c compare the experimental data with the kinetic model for concentration profiles of lignite (A), and the carbon concentrations of humic acids in water (B) at three different temperatures of 25, 50, and 75° C. as a function of time, respectively. It is clear that the proposed reaction kinetics model is fitted well with the experimental data, especially at low temperatures of 25, and 50° C. As shown, the reaction temperature is a key parameter in the formation of humic acids through water-oxygen reaction over the reaction time. Therefore, the formation of water-solubilized humic acids in water is increased and reached the maximum concentration faster at high temperatures. However, at a high temperature of 75° C., the experimental data has deviated from the kinetics model, especially at longer reaction times of 60 and 120 min, this can be explained by the fact that at these severe conditions the possibility of producing CO2 in the gas phase is evidenced by the GC analysis. Therefore, the highest conversion of humic acid with almost zero emissions of direct CO2 was obtained at 50° C. which can be considered the optimal reaction conditions for high yield of humic acids which was also confirmed in the previous section.

Insights onto the Reaction Mechanisms for Humic Acid Analog Formation from Lignite The low temperature oxidation (LTO) of coal is believed to take place as soon as the solid comes into contact with atmospheric oxygen at reaction temperatures between 25 and 150° C. [69-71]. The oxidation is instituted by oxygen diffusion into active sites at the coal-lignite surface as well as inside the pores, for the case of porous coal. The oxidation process is affected by a number of factors, such as temperature, oxygen pressure, water vapor, particle size, and the physical and chemical properties of coal [69, 70, 72]. The interactions between coal and oxygen in the presence of water (inherent water) has a main role in the LTO process. It is believed that water molecules can block oxygen diffusion towards the reaction sites insides the pores, leading to lower oxidation rate [16, 73]. However, water can also act as a catalyst to some of the oxidation pathways [74-76]. Under our exemplified conditions, KOH was also used to catalyze the process. Thus, the LTO of lignite can be ruled by O2 as well as —OH species.

Figure 17:
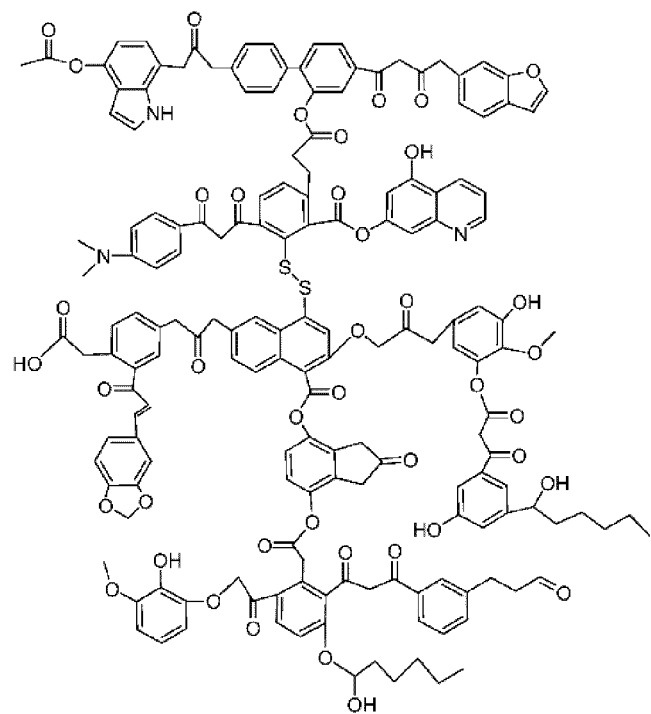
FIG. 17. Macromolecular structure model of Shengli lignite.

The chemical structure of lignite was subject to debate due to its origin, complexity, and heterogeneity. In this context, we adapt the model proposed by Feng et al., since it is based on experimental investigations. The model, shown in FIG. 17, is composed of a macromolecular structure of aromatic rings connected by aliphatic —CH2—, —C—O— and —C═O— bridges. The molecule is characterized by the presence of phenolic (OH), ether (—C—O—), and carboxylic (COOH) groups. The LTO of lignite causes a decrease in the N and H content versus an increase in the O content. Through this process, the reactive oxygenated functional groups, such-OH are converted to more stable ones such as COOH.

Figure 18:
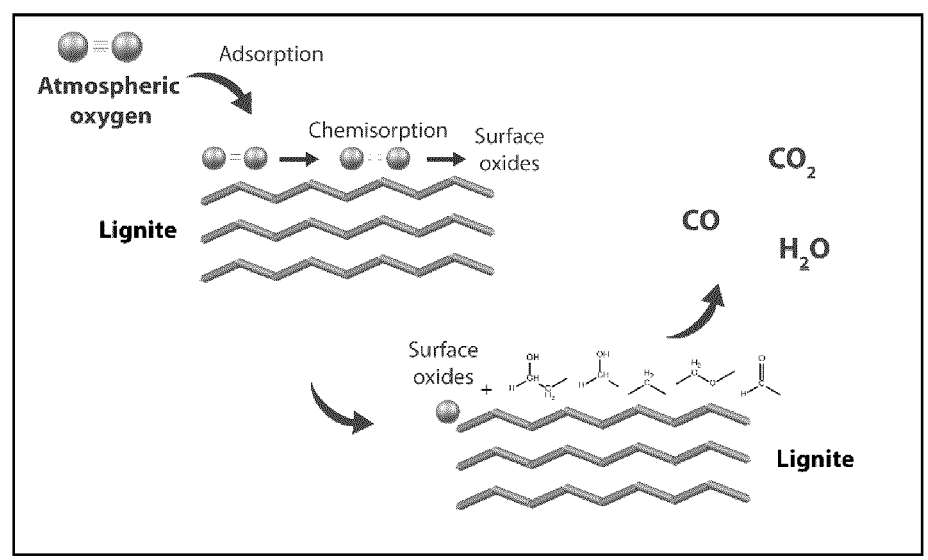
FIG. 18. Proposed mechanism for low temperature oxidation of lignite.

The LTO reaction mechanism was a subject of debate for long time [71, 78]. FIG. 18 illustrates the present understanding of the process [71, 73]. The oxidation proceeds via the following four steps; (1) physical adsorption of molecular oxygen into the surface of lignite (and the pores); (2) chemisorption of oxygen at the active sites to form unstable carbon-oxygen intermediates such as peroxides (—O—O—) and hydroperoxides (—O—O—H). This will also cause a weakening of the O═O double bond; (3) decomposition of the unstable oxygenated intermediates to form new stable compounds with functional groups such as OH, C═O, and COOH; and (4) for the case of high temperature conditions (>150° C.), degradation of the stable products formed in step 3 at higher temperatures to gaseous products (i.e. CO, CO2, and H2O) and the generation of new active sites.

Due to the high activation energies required to break the C—C, C—O, and C═O bonds, the degradation in step 4 requires temperatures higher than 200° C. [36, 79]. Therefore, the oxidation at low temperature terminates at step 3 forming phenolic (OH), carbonyl(C═O), and carboxylic (COOH) functional groups which are representatives of humic acids structure. This can explain why only insignificant amount of CO2 (or CO) was observed in our experiments at 75° C. in presence of alkaline medium. Rather, there was an evidence for the formation of the aforementioned functional groups as discussed earlier in Section 3.2.1 (cf. FIG. 9).

In their study on the LTO of lignite, Shi et al., have studied the reactivity of the reactive sites in lignite against molecular oxygen using theoretical calculations. It was concluded that the reactivity of the functional groups follows the order: —HCOH—CH2—>—HCOH—>—HCOH—CH3>—CHCH3—CH2—>—CH2—>—CH2—O—>—CHO>—O—CH3

This Example illustrates that more humic acids, signaled by the formation of COOH groups, are formed at low temperature (<75° C.) in an alkaline medium, and insignificant amount CO2 emissions were released. To account for this observation, we mentioned that the oxidation involves a decomposition of the unstable oxygenated intermediates (step 3) to form highly stable oxygenated groups such as COOH, which mostly take place at moderate temperatures. Step 4, however, involves the degradation of the stable functional groups into gaseous CO/CO2. It is well known that this degradation requires the rupture of strong C—C, C—O, and C═O bonds, which does not happen at temperatures lower than 200° C., for the case of dry oxidation [71, 73]. Moreover, the LTO process depends on thermodynamical as well as kinetic factors. In this work, the activation energy for lignite in an alkaline water-oxygen system was determined to be 26.14 KJ/mol. Typically, reactions with activation energies lower than ~40 KJ/mol are considered spontaneous at room temperature. The low value of activation energy obtained in this work supports this fact. In addition to the role of oxygen in the LTO process, the experimental conditions for this study involves the use of KOH. We showed in our previous works that the hydroxide anion (—OH) plays an essential role in the oxy-cracking of aromatic compounds [36]. —OH is thought to be the hydrolyzed form of the highly-reactive hydroxide radical (·OH) in aqueous medium. In our recent work, we determined that reactions of anion (—OH) with quinolin-65, an asphaltene model molecule, are both kinetically and thermodynamically favorable. The activation energies of the oxidation reactions, obtained using theoretical calculations, were ranging from 40-70 KJ/mol. These low values suggest that the low temperature oxidation of lignite might be also caused by reactions with the —OH anion, in addition to molecular O2.

Ammonolysis

In addition to the use of KOH, ammonium hydroxide ($NH_4OH$) may be introduced in an ammonolysis process that converts lignite to humate fertilizer using the present water-oxygen system. In this case, $NH_4OH$ in the context of the disclosed system may be used to introduce nitrogen and oxygen into the lignite structure, and thus the resultant product provides a soil conditioning agent that replaces natural humus lost from degraded and arid soils. Such products may be applied as a deep layer onto impoverished soil as an alternative to organic waste materials such as manure and mineral fertilizers, providing high-grade humus to improve soil development and plant growth.

DEFINITIONS AND INCORPORATED REFERENCES

Definitions

Although various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way. Terms such as "exemplary" or "exemplified" are used herein to mean "serving as an example, instance, or illustration." Any implementation described herein as "exemplary" or "exemplified" is accordingly not to be construed as necessarily preferred or advantageous over other implementations, all such implementations being independent embodiments. Unless otherwise stated, numeric ranges are inclusive of the numbers defining the range, and numbers are necessarily approximations to the given decimal. The word "comprising" is used herein as an open-ended term, substantially equivalent to the phrase "including, but not limited to", and the word "comprises" has a corresponding meaning. As used herein, the singular forms "a", "an" and "the" include plural referents unless the context clearly dictates otherwise. Thus, for example, reference to "a thing" includes more than one such thing.

REFERENCES

1. Technavio. Global Humic Acid Market-Forecasts and Analysis. 2017 [cited 2019, 12 Mar.]; Available from: https://www.businesswire.com/news/home/20171003005921/en/Global-Humic-Acid-Market—Forecasts-Analysis.
2. Research, G. V. Industry Research Report. 2016 [cited 2019, 10 Aug.]; Available from: https://www.grandviewresearch.com/industry-analysis/humic-acid-market.
3. Pulidindi, K. and H. Pandey. Humic Acid Market to exceed USD 1 billion by 2024. 2017 [cited 2019, 20 Jan.]; Available from: https://www.gminsights.com/pressrelease/humic-acid-market.
4. Market, G. H. A. Transparency Market Research. 2018 [cited 2019, 16 Jan.]; Available from: https://www.transparencymarketresearch.com/pressrelease/humic-acid-market.htm.
5. Pulidindi, K. and H. Pandey. Humic acid market size by application. 2017 [cited 2019, 20 Jan.]; Available from: https://www.gminsights.com/industry-analysis/humic-acid-market
6. Kutepatil, O. Humic Acid Market to witness heavy demand in agriculture sector, North America to be the leading growth avenue. 2017 [cited 2019, 18 Jan.]; Available from: https://gminsights.wordpress.com/2017/05/31/humic-acid-market/.
7. Schnitzer, M. and S. Khan, Humic substances in the environment. Marcel Dekker, New York. Humic substances in the environment. Marcel Dekker, New York., 1972: p . . .
8. Fukushima, M., et al., Acid-base characterization of molecular weight fractionated humic acid. Talanta, 1996. 43 (3): p. 383-390.
9. Ikeya, K., et al., Size distribution of condensed aromatic rings in various soil humic acids. Organic geochemistry, 2011. 42 (1): p. 55-61.
10. Stevenson, F. J., Humus chemistry: genesis, composition, reactions. 1994: John Wiley & Sons.
11. Tan, K. H., Humic matter in soil and the environment: principles and controversies. 2014: CRC Press.
12. Kurková, M., et al., Humic acids from oxidized coals: I. Elemental composition, titration curves, heavy metals in HA samples, nuclear magnetic resonance spectra of HAs and infrared spectroscopy. Chemosphere, 2004. 54 (8): p. 1237-1245.
13. Asing, J., N. Wong, and S. Lau, Optimization of extraction method and characterization of humic acid derived from coals and composts. J. Trop. Agric. and Fd. Sc, 2009. 37 (2): p. 211-223.
14. Pettit, R. E., Organic matter, humus, humate, humic acid, fulvic acid and humin: their importance in soil fertility and plant health. CTI Research, 2004: p. 1-17.
15. Hatcher, P., et al., In Humic Substances in the Global Environment and Implications on Human Health; Senesi, N.; Miano, T M, Eds. 1994, Elsevier: Amsterdam.
16. Calemma, V., et al., Changes in coal structure accompanying the formation of regenerated humic acids during air oxidation. Fuel, 1994. 73 (5): p. 700-707.
17. Zhang, Y.-Y., et al., Investigation on the structural feature of Shengli lignite. International Journal of Mining Science and Technology, 2018. 28 (2): p. 335-342.
18. Liu, F.-J., et al., Selective production and characterization of aromatic carboxylic acids from Xianfeng lignite-derived residue by mild oxidation in aqueous H2O2 solution. Fuel processing technology, 2018. 181: p. 91-96.
19. Sarlaki, E., et al., Extraction and purification of humic acids from lignite wastes using alkaline treatment and membrane ultrafiltration. Journal of Cleaner Production, 2019. 235: p. 712-723.
20. Zhang, Y., et al., A comparative study on the structural features of humic acids extracted from lignites using comprehensive spectral analyses. RSC Advances, 2020. 10 (37): p. 22002-22009.
21. Huculak-Mączka, M., J. Hoffmann, and K. Hoffmann, Evaluation of the possibilities of using humic acids obtained from lignite in the production of commercial fertilizers. Journal of soils and sediments, 2018. 18 (8): p. 2868-2880.
22. Cheng, G., et al., Extraction of humic acid from lignite by KOH-hydrothermal method. Applied Sciences, 2019. 9 (7): p. 1356.
23. Wali, A., et al., A novel humic acid extraction procedure from Tunisian lignite. Euro-Mediterranean Journal for Environmental Integration, 2019. 4 (1): p. 24.

24. Doskočil, L., et al., Spectral characterization and comparison of humic acids isolated from some European lignites. Fuel, 2018. 213: p. 123-132.
25. Peuravuori, J., P. Žbánková, and K. Pihlaja, Aspects of structural features in lignite and lignite humic acids. Fuel Processing Technology, 2006. 87 (9): p. 829-839.
26. Zingaretti, D., et al., Humic Substances Extracted from a Bio-stabilized Waste Applying Different Operating Conditions. WASTE AND BIOMASS VALORIZATION, 2020.
27. Jiang, P. W., Z. J. Ma, and Y. X. Han. Experimental study on extracting humic acid from lignite. in Advanced Materials Research. 2011. Trans Tech Publ.
28. Fong, S. S., et al., A comparative evaluation on the oxidative approaches for extraction of humic acids from low rank coal of Mukah, Sarawak. Journal of the Brazilian Chemical Society, 2007. 18 (1): p. 34-40.
29. Srivastava, K. C. and D. S. Walia, Biological production of humic acid and clean fuels from coal, in U.S. Patent and Trademark Office. 1997, U.S. Pat. No. 5,670,345: Washington, DC.
30. Prosyolkov, N. V., et al., A Method of Production of Humic Acid Concentrate from Brown Coal and a Line for Humic Acid Concentrate Production 2013.
31. Sasaki, Y. and T. Oyamada, Studies on the chemical utilization of lignite (IV): Alkali semi-dry method for preparing humic acids. Bulletin of Yamagata University, 1966. 9 (1): p. 121-129.
32. Estévez, M., et al., Formation of humic acids in lignites and subbituminous coals by dry air oxidation. Fuel, 1990. 69 (2): p. 157-160.
33. Manasrah, A.D., Conversion of Petroleum Coke into Valuable Products using Catalytic and Non-Catalytic Oxy-Cracking Reaction. 2018.
34. Manasrah, A.D., N. N. Nassar, and L.C. Ortega, Conversion of petroleum coke into valuable products using oxy-cracking technique. Fuel, 2018. 215: p. 865-878.
35. Ashtari, M., L. Carbognani, and P. Pereira-Almao, Asphaltenes aqueous conversion to humic and fulvic analogs via oxy-cracking. Energy & Fuels, 2016. 30 (7): p. 5470-5482.
36. Manasrah, A. D., et al., Experimental and theoretical studies on oxy-cracking of Quinolin-65 as a model molecule for residual feedstocks. Reaction Chemistry & Engineering, 2017. 2 (5): p. 703-719.
37. Luong, D., M.A. Sephton, and J. S. Watson, Subcritical water extraction of organic matter from sedimentary rocks. Analytica chimica acta, 2015. 879: p. 48-57.
38. Ahmed, F., Chemical Characterization of Humic and Fulvic Acid Analogs Obtained from Wet Air Oxidation (WAO) at Different severities. 2018, Schulich School of Engineering.
39. Burdick, E. M., Commercial humates for agriculture and the fertilizer industry. Economic Botany, 1965. 19 (2): p. 152-156.
40. ISO-19822, Fertilizers and soil conditioners—Determination of humic and hydrophobic fulvic acids concentrations in fertilizer materials. 2018: International Organization for Standardization.
41. Khan, S. and M. Schnitzer, The retention of hydrophobic organic compounds by humic acid. Geochimica et Cosmochimica Acta, 1972. 36 (7): p. 745-754.
42. Lavrik, N. L. and N. M. Bazhin, EXPRESS: Study on the Self-Association of the Macromolecules of Humic Acid "Aldrich" in Aqueous Solutions Using Ultraviolet-Visible (UV-Vis) Absorption Spectroscopy. Applied spectroscopy, 2019: p. 0003702819829809.
43. Marieh, N., Characterization of soil humic substances in Hungarian and Iranian soils. Unpublished Ph. D. Thesis, Szentistvan University, 2012.
44. Chen, Y., N. Senesi, and M. Schnitzer, Information provided on humic substances by E4/E6 ratios 1. Soil science society of America journal, 1977. 41 (2): p. 352-358.
45. Deshpande, G. V., et al., Extraction of coal using supercritical water. Fuel, 1984. 63 (7): p. 956-960.
46. Kashimura, N., J.-i. Hayashi, and T. Chiba, Degradation of a Victorian brown coal in sub-critical water. Fuel, 2004. 83 (3): p. 353-358.
47. Ramos, L., E. M. Kristenson, and U. T. Brinkman, Current use of pressurised liquid extraction and subcritical water extraction in environmental analysis. Journal of Chromatography A, 2002. 975 (1): p. 3-29.
48. Yammine, S., et al., Extraction and purification of high added value compounds from by-products of the winemaking chain using alternative/nonconventional processes/technologies. Critical reviews in food science and nutrition, 2018. 58 (8): p. 1375-1390.
49. Bozan, B., G. Tosun, and D. Özcan, Study of polyphenol content in the seeds of red grape (*Vitis vinifera* L.) varieties cultivated in Turkey and their antiradical activity. Food chemistry, 2008. 109 (2): p. 426-430.
50. Guerrero, M. S., J. S. Torres, and M. J. Nuñez, Extraction of polyphenols from white distilled grape pomace: Optimization and modelling. Bioresource technology, 2008. 99 (5): p. 1311-1318.
51. Moschopedis, S. E. and J. G. Speight, Influence of metal salts on bitumen oxidation. Fuel, 1978. 57 (4): p. 235-240.
52. Headley, J. V., et al., Determination of dissolved naphthenic acids in natural waters by using negative-ion electrospray mass spectrometry. Journal of AOAC International, 2002. 85 (1): p. 182-187.
53. Patil, P. T., et al., Heterogeneously catalyzed hydroprocessing of organosolv lignin in sub- and supercritical solvents. Energy & Fuels, 2011. 25 (10): p. 4713-4722.
54. Badran, I., A.D. Manasrah, and N. N. Nassar, A combined experimental and density functional theory study of metformin oxy-cracking for pharmaceutical wastewater treatment. RSC Advances, 2019. 9 (24): p. 13403-13413.
55. Ju, Z. Y. and L. R. Howard, Effects of solvent and temperature on pressurized liquid extraction of anthocyanins and total phenolics from dried red grape skin. Journal of Agricultural and food Chemistry, 2003. 51 (18): p. 5207-5213.
56. Yammine, S., Extraction des molécules à haute valeur ajoutée par eau sous critique et fractionnement par procédés membranaires: Valorisation des co-produits de la vigne et du vin par des procédés éco-innovants. 2016, Bordeaux.
57 Fong, S. S., et al., Characterization of the coal derived humic acids from Mukah, Sarawak as soil conditioner. Journal of the Brazilian Chemical Society, 2006. 17 (3): p. 582-587.
58. Dick, D. P., et al., Chemical and spectroscopical characterization of humic acids from two south Brazilian coals of different ranks. Journal of the Brazilian Chemical Society, 2002. 13 (2): p. 177-182.
59. Reddy, S. B., et al., Fourier Transform Infrared (FTIR) Spectroscopy of Soil Humic and Fulvic Acids Extracted from Paddy Land Use System. Int. J. Curr. Microbiol. App. Sci, 2018. 7 (5): p. 834-837.
60. Fuentes, M., et al., New methodology to assess the quantity and quality of humic substances in organic materials and commercial products for agriculture. Journal of soils and sediments, 2018. 18 (4): p. 1389-1399.
61. Piccolo, A., S. Nardi, and G. Concheri, Structural characteristics of humic substances as related to nitrate uptake and growth regulation in plant systems. Soil Biology and Biochemistry, 1992. 24 (4): p. 373-380.
62. Canellas, L. P., et al., Humic acids increase the maize seedlings exudation yield. Chemical and Biological Technologies in Agriculture, 2019. 6 (1): p. 3.
63. Kononova, M. and I. Alexandrova, Formation of humic acids during plant residue humification and their nature. Geoderma, 1973. 9 (3): p. 157-164.
64. Uyguner, C. S. and M. Bekbolet, Evaluation of humic acid photocatalytic degradation by UV-vis and fluorescence spectroscopy. Catalysis Today, 2005. 101 (3-4): p. 267-274.
65. Uyguner, C. S., et al., Evaluation of adsorption and coagulation characteristics of humic acids preceded by alternative advanced oxidation techniques. Desalination, 2007. 210 (1-3): p. 183-193.
66. Simsek, Y. E. and L. Degirmenci, Effect of Atmosphere and Temperature Treatment on Leoanardite for Increasing Humic Acid Yield. Journal of the Geological Society of India, 2018. 92 (2): p. 209-214.
67. Yuan, C., et al., Environment friendly bleaching methods of montan wax. J. Chem. Pharm. Res, 2014. 6: p. 1223.
68. Tang, Y., et al., Value-added humic acid derived from lignite using novel solid-phase activation process with Pd/CeO2 nanocatalyst: a physiochemical study. ACS Sustainable Chemistry & Engineering, 2017. 5 (11): p. 10099-10110.
69. Schmidt, L., Changes in coal during storage. Chemistry of coal utilization, 1945. 18: p. 627-676.
70. Van Krevelen, D. W., Coal: typology, physics, chemistry, constitution. 1993: Elsevier Amsterdam.
71. Wang, H., B. Z. Dlugogorski, and E. M. Kennedy, Role of inherent water in low-temperature oxidation of coal. Combustion Science and Technology, 2003. 175 (2): p. 253-270.
72. Huggins, F. and G. Huffman, Coal weathering and oxidation: the early stages, in Chemistry of coal weathering. 1989, Elsevier Amsterdam. p. Elsevier.
73. Wang, H., B. Z. Dlugogorski, and E. M. Kennedy, Coal oxidation at low temperatures: oxygen consumption, oxidation products, reaction mechanism and kinetic modelling. Progress in energy and combustion science, 2003. 29 (6): p. 487-513.
74. Jones, R. and D. Townend, Mechanism of the oxidation of coal. Nature, 1945. 155 (3936): p. 424-425.
75. Jones, R. and D. Townend, The oxidation of coal. Journal of the Society of Chemical Industry, 1949. 68 (7): p. 197-201.
76. Petit, J., A comprehensive study of the water vapour/coal system: application to the role of water in the weathering of coal. Fuel, 1991. 70 (9): p. 1053-1058.
77. Feng, L., et al., Construction of the molecular structure model of the Shengli lignite using TG-GC/MS and FTIR spectrometry data. Fuel, 2017. 203: p. 924-931.
78. Clemens, A. H., T. W. Matheson, and D. E. Rogers, Low temperature oxidation studies of dried New Zealand coals. Fuel, 1991. 70 (2): p. 215-221.
79. Luo, Y.-R., Comprehensive handbook of chemical bond energies. 2007: CRC press.
80. Shi, T., et al., The mechanism at the initial stage of the room-temperature oxidation of coal. Combustion and Flame, 2005. 140 (4): p. 332-345.

Citation of references herein is not an admission that such references are prior art to the present invention. Any priority document(s) and all publications, including but not limited to patents and patent applications, cited in this specification, and all documents cited in such documents and publications, are hereby incorporated herein by reference as if each individual publication were specifically and individually indicated to be incorporated by reference herein and as though fully set forth herein. The invention includes all embodiments and variations substantially as hereinbefore described and with reference to the examples and drawings.

The invention claimed is:

1. A process for the production of humic acids from a coal comprising a humic substance content, the process comprising:
   mixing a comminuted coal solids fraction derived from the coal with an alkaline solution to produce a pre-solubilized slurry;
   treating the pre-solubilized slurry under subcritical extraction conditions in a basic aqueous extraction medium for an effective extraction residence time period of less than 2 hours to extract humic acids from the coal solids, wherein the extraction conditions comprise:
   an extraction temperature, being on average less than about 51° C.;
   an extraction pressure, being on average less than about 0.5 MPa;
   a flow of an oxygen containing gas; and,
   KOH;
   separating a humic acid solution product stream from residual solids and recovering the humic acid solution product stream, wherein the humic acid solution product stream comprises humic acids and fulvic acids, wherein the proportion of humic acids to fulvic acids in the humic acid solution product stream is at least 85% humic acids, wherein the conversion of the humic substance content of the coal into the humic acids and fulvic acids of the humic acid solution product stream is at least 90%; and wherein the proportion of the humic substance content of the coal converted to $CO_2$ under the extraction conditions during the extraction time period is less than 5%.

2. The process of claim 1, wherein the extraction temperature is from 25 to 50° C.

3. The process of claim 1, wherein the extraction pressure is from 0.1 MPa to 0.5 MPa.

4. The process of claim 1, wherein the conversion of the humic substance content of the coal into the humic acids and fulvic acids of the humic acid solution product stream is at least 94%.

5. The process of claim 1, wherein the coal is a lignite.

6. The process of claim 1, wherein the oxygen containing gas is air.

7. The process of claim 1, wherein the flow of the oxygen containing gas comprises sparging the basic aqueous extraction medium with the oxygen containing gas.

8. The process of claim 1, wherein the comminuted coal solids comprises particles of size from about 53 to about 950 µm.

9. The process of claim 1, wherein the mass ratio of the coal to the liquid is ratio of lignite to water is from about 0.05 to about 0.075.

10. The process of claim 1, further comprising comminuting the coal to provide the comminuted coal solids fraction.

11. The process of claim 1, wherein the effective extraction residence time period is less than about 1 hour.

12. The process of claim 1, further comprising adding ammonium hydroxide (NH4OH) to the basic aqueous extraction medium in an amount effective in an ammonolysis process to convert lignite to a humate fertilizer.

13. The process of claim 1, wherein the proportion of the humic substance content of the coal converted to $CO_2$ under the extraction conditions during the extraction time period is less than 4, 3, 2, 1 or 0.5%.

* * * * *